(12) United States Patent
Oami et al.

(10) Patent No.: US 12,136,272 B2
(45) Date of Patent: Nov. 5, 2024

(54) IMAGE PRESENTATION DEVICE, IMAGE PRESENTATION METHOD, AND NON-TRANSITORY COMPUTER-READABLE MEDIUM STORING PROGRAM

(71) Applicant: NEC Corporation, Tokyo (JP)

(72) Inventors: Ryoma Oami, Tokyo (JP); Hideki Amemiya, Tokyo (JP); Kazuki Ogata, Tokyo (JP); Koyo Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 426 days.

(21) Appl. No.: 17/603,663

(22) PCT Filed: Apr. 17, 2019

(86) PCT No.: PCT/JP2019/016531
§ 371 (c)(1),
(2) Date: Oct. 14, 2021

(87) PCT Pub. No.: WO2020/213105
PCT Pub. Date: Oct. 22, 2020

(65) Prior Publication Data
US 2022/0198809 A1 Jun. 23, 2022

(51) Int. Cl.
*G06V 20/58* (2022.01)
*G06T 7/20* (2017.01)
(Continued)

(52) U.S. Cl.
CPC ............ *G06V 20/58* (2022.01); *G06T 7/20* (2013.01); *G06T 7/70* (2017.01); *G06T 11/00* (2013.01);
(Continued)

(58) Field of Classification Search
CPC .......... G06V 20/58; G06V 10/62; G06T 7/20; G06T 7/70; G06T 11/00;
(Continued)

(56) References Cited

U.S. PATENT DOCUMENTS

2013/0307986 A1 11/2013 Numata et al.
2015/0224995 A1* 8/2015 Yamaoka .............. B60W 10/18
702/141
(Continued)

FOREIGN PATENT DOCUMENTS

JP 2007-024599 A 2/2007
JP 2007-069806 A 3/2007
(Continued)

OTHER PUBLICATIONS

WO2011108091 translation (Year: 2011).*
JP2007024599 translation (Year: 2007).*
International Search Report for PCT Application No. PCT/JP2019/016531, mailed on Jul. 16, 2019.

*Primary Examiner* — Carol Wang

(57) ABSTRACT

A vehicle speed acquiring unit acquires a vehicle speed. A moving range calculating unit calculates, based on the vehicle speed, a pre-stop moving range within which the vehicle may cover before coming to a stop. A sensor information acquiring unit acquires object detection information indicating a detected object, detected by a sensor, in the surroundings of the vehicle. An image superposing unit superposes the pre-stop moving range and the position of the detected object included in the object detection information on top of each other on a screen. In addition, the image superposing unit generates a superposed image that displays the position of a detected object estimated, based on position information of the detected object included in the object detection information, to have a possibility of overlapping the pre-stop moving range, more saliently than the positions of other detected objects. An image presenting unit presents the generated superposed image.

16 Claims, 34 Drawing Sheets

(51) Int. Cl.
*G06T 7/70* (2017.01)
*G06T 11/00* (2006.01)
*G08G 1/16* (2006.01)

(52) U.S. Cl.
CPC ...... *G08G 1/16* (2013.01); *G06T 2207/10016* (2013.01); *G06T 2207/30252* (2013.01)

(58) Field of Classification Search
CPC ........... G06T 2207/10016; G06T 2207/30252; G08G 1/16; B60K 2360/167; B60K 2360/177; B60K 2360/179; B60K 35/28; B60K 35/00; B60W 2050/146; B60W 2520/10; B60W 2554/801; B60W 2554/802; B60W 2556/10; B60W 30/0953; B60W 30/0956; B60W 50/14
See application file for complete search history.

(56) References Cited

U.S. PATENT DOCUMENTS

| | | | |
|---|---|---|---|
| 2016/0023655 A1* | 1/2016 | Makino | B60W 10/20 |
| | | | 701/41 |
| 2018/0056866 A1 | 3/2018 | Nagasawa et al. | |
| 2018/0090007 A1 | 3/2018 | Takemori et al. | |
| 2020/0307573 A1* | 10/2020 | Kato | B60W 60/0027 |

FOREIGN PATENT DOCUMENTS

| | | | | |
|---|---|---|---|---|
| JP | 2013-185940 A | 9/2013 | | |
| JP | 2014-099078 A | 5/2014 | | |
| JP | 2016-172469 A | 9/2016 | | |
| JP | 2018-032240 A | 3/2018 | | |
| WO | WO-2011108091 A1 * | 9/2011 | ............. | B60K 35/00 |
| WO | 2012/102391 A1 | 8/2012 | | |

* cited by examiner

IMAGE PRESENTATION DEVICE, IMAGE PRESENTATION METHOD, AND NON-TRANSITORY COMPUTER-READABLE MEDIUM STORING PROGRAM This application is a National Stage Entry of PCT/JP2019/016531 filed on Apr. 17, 2019, the contents of all of which are incorporated herein by reference, in their entirety.

TECHNICAL FIELD

The present invention relates to image presentation devices, image presentation methods, and non-transitory computer-readable media storing programs.

BACKGROUND ART

There have been proposed techniques for presenting drivers with the conditions surrounding their vehicles. For example, Patent Literature 1 discloses an in-vehicle navigation device. The device according to Patent Literature 1 includes a speed detecting means that detects the speed of a vehicle; a calculating means that calculates, based on the speed of the vehicle detected by the speed detecting means, a stoppable range within which the vehicle can stop through a decelerating operation; and a displaying means. The displaying means displays the stoppable range of the vehicle calculated by the calculating means along with displayed map data.

Patent Literature 2 discloses a drive assisting device for a vehicle that can alert a driver so that the driver, regardless of his or her sense or driving techniques, can keep the vehicle from colliding with an obstruction reliably and accurately. The device according to Patent Literature 2 includes an imaging unit that is provided in a vehicle and that captures an image of the surroundings of the vehicle, an information acquiring unit that acquires speed information of the vehicle, and an image processing unit that processes an image signal of the captured image output from the imaging unit. This image processing unit includes an image superposing unit that superposes, on the captured image, an image indicating a braking range corresponding to the speed information of the vehicle acquired by the information acquiring unit.

Patent Literature 3 discloses an obstruction detecting device for a vehicle that determines the possibility that a host vehicle and an obstruction come into contact with each other by predicting the moving direction and the moving distance of each of the host vehicle and the obstruction. In the device according to Patent Literature 3, an obstruction is detected based on a video captured by a first camera and a second camera. An obstruction position calculating unit and a host vehicle position calculating unit calculate respective prediction vectors indicating the future moving direction and the future moving distance of the obstruction and the host vehicle, respectively, based on the past moving direction and the past moving distance, and these prediction vectors are displayed on top of a video captured by the first camera. Moreover, a determining unit determines the possibility that the host vehicle and the obstruction come into contact with each other based on the prediction vectors and provides a warning based on the result of the determination.

CITATION LIST

Patent Literature

Patent Literature 1: Japanese Unexamined Patent Application Publication No. 2007-024599

Patent Literature 2: International Patent Publication No. WO2012/102391

Patent Literature 3: Japanese Unexamined Patent Application Publication No. 2007-069806

SUMMARY OF INVENTION

Technical Problem

It is desirable that the techniques for presenting a driver with the conditions surrounding his or her vehicle assist the driver in avoiding a collision between the vehicle and an obstruction before the vehicle comes to a stop. The technique according to Patent Literature 2 merely superposes an image indicating the braking range corresponding to the speed information of the vehicle onto a captured image and does not recognize an obstruction. Therefore, the technique according to Patent Literature 2 may not be capable of providing an appropriate presentation for preventing a collision between the vehicle and an obstruction before the vehicle comes to a stop. The technique according to Patent Literature 3 merely determines the possibility that the host vehicle and an obstruction come into contact with each other by predicting the moving direction and the moving distance of each of the host vehicle and the obstruction, and this technique fails to take into consideration the moving range to be covered before the vehicle comes to a stop. Therefore, the technique according to Patent Literature 3 may not be capable of providing an appropriate presentation for preventing a collision between the vehicle and an obstruction before the vehicle comes to a stop.

The present disclosure has been made in view of such shortcomings and is directed to providing an image presentation device, an image presentation method, and a program that each can provide assistance for preventing a collision between a vehicle and an obstruction before the vehicle comes to a stop.

Solution to Problem

An image presentation device according to the present disclosure includes vehicle speed acquiring means, moving range calculating means, sensor information acquiring means, image superposing means, and image presenting means. The vehicle speed acquiring means is configured to acquire a vehicle speed, which is a speed of a vehicle. The moving range calculating means is configured to calculate a pre-stop moving range based on the vehicle speed, and the pre-stop moving range is a range within which the vehicle moves before coming to a stop. The sensor information acquiring means is configured to acquire object detection information regarding one or more detected objects, detected by use of a sensor, in surroundings of the vehicle. The image superposing means is configured to superpose the pre-stop moving range and positions of the one or more detected objects included in the object detection information on top of each other on a screen. The image superposing means is further configured to generate a superposed image displaying a position of a detected object, among the detected objects, estimated to have a possibility of overlapping the pre-stop moving range based on position information of the detected object, more saliently than positions of the other detected objects. The image presenting means is configured to present the generated superposed image.

An image presentation method according to the present disclosure includes acquiring a vehicle speed, the vehicle speed being a speed of a vehicle; calculating a pre-stop moving range based on the vehicle speed, the pre-stop moving range being a range within which the vehicle moves before coming to a stop; acquiring object detection information regarding one or more detected objects, detected by use of a sensor, in surroundings of the vehicle; superposing the pre-stop moving range and positions of the one or more detected objects included in the object detection information on top of each other on a screen, and generating a superposed image displaying a position of a detected object, among the detected objects, estimated to have a possibility of overlapping the pre-stop moving range based on position information of the detected object, more saliently than positions of the other detected objects; and presenting the generated superposed image.

A program according to the present disclosure causes a computer to execute: a step of acquiring a vehicle speed, the vehicle speed being a speed of a vehicle; a step of calculating a pre-stop moving range based on the vehicle speed, the pre-stop moving range being a range within which the vehicle moves before coming to a stop; a step of acquiring object detection information regarding one or more detected objects, detected by use of a sensor, in surroundings of the vehicle; a step of superposing the pre-stop moving range and positions of the one or more detected objects included in the object detection information on top of each other on a screen, and generating a superposed image displaying a position of a detected object, among the detected objects, estimated to have a possibility of overlapping the pre-stop moving range based on position information of the detected object, more saliently than positions of the other detected objects; and a step of presenting the generated superposed image.

Advantageous Effects of Invention

The present disclosure can provide an image presentation device, an image presentation method, and a program that each can provide assistance for preventing a collision between a vehicle and an obstruction before the vehicle comes to a stop.

DESCRIPTION OF EMBODIMENT

Overview of Example Embodiments According to the Present Disclosure

Figure 1:
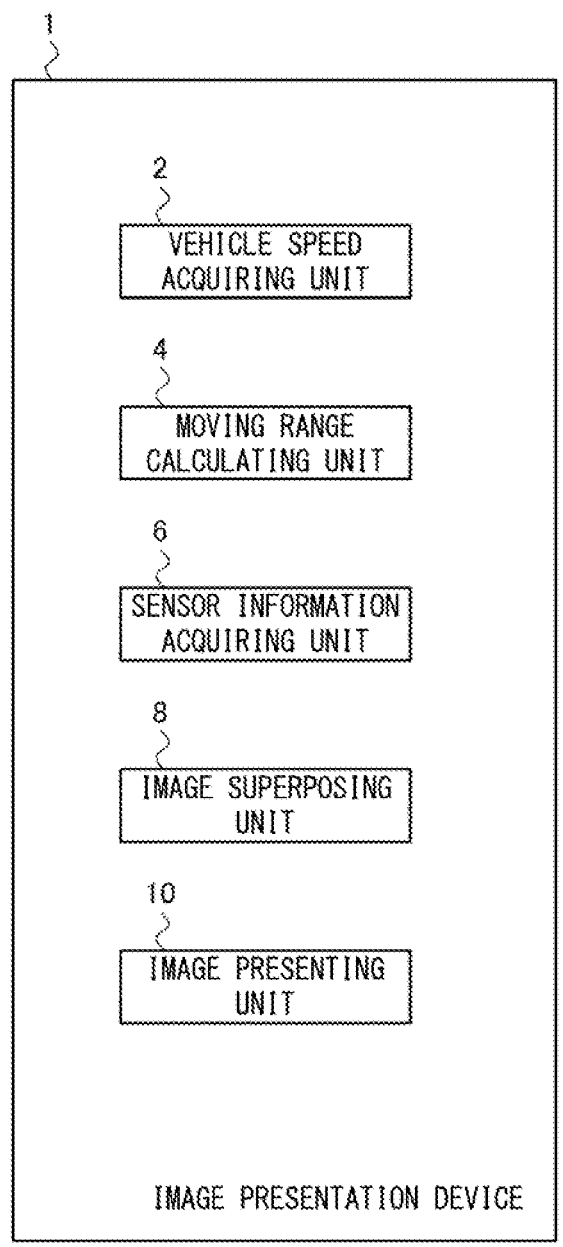
FIG. 1 illustrates an overview of an image presentation device according to an example embodiment of the present disclosure.

Prior to describing some example embodiments of the present disclosure, an overview of the example embodiments according to the present disclosure will be described. FIG. 1 illustrates an overview of an image presentation device 1 according to an example embodiment of the present disclosure. The image presentation device 1 includes a vehicle speed acquiring unit 2, a moving range calculating unit 4, a sensor information acquiring unit 6, an image superposing unit 8, and an image presenting unit 10. The vehicle speed acquiring unit 2, the moving range calculating unit 4, the sensor information acquiring unit 6, the image superposing unit 8, and the image presenting unit 10 function as, respectively, a vehicle speed acquiring means, a moving range calculating means, a sensor information acquiring means, an image superposing means, and an image presenting means.

The vehicle speed acquiring unit 2 acquires the vehicle speed, which is the speed of a vehicle. The vehicle is, for example but not limited to, a passenger vehicle. The moving range calculating unit 4 calculates, based on the vehicle speed, a pre-stop moving range within which the vehicle may cover before coming to a stop. The sensor information acquiring unit 6 acquires object detection information indicating a detected object detected by a sensor in the surroundings of the vehicle. The image superposing unit 8 superposes the pre-stop moving range and the position of the detected object included in the object detection information on top of each other on a screen. In addition, the image superposing unit 8 generates a superposed image that displays the position of a detected object, estimated to have a possibility of overlapping the pre-stop moving range based on position information of the detected object included in the object detection information, more saliently than the positions of other detected objects. The image presenting unit 10 presents the generated superposed image. Now, some problems of the related arts will be described.

There have been proposed devices that calculate, based on the current vehicle speed, a stop position where the vehicle comes to a stop through a decelerating operation and present the driver with the calculated stop position. For example, Patent Literature 1 discloses the in-vehicle navigation device that, in order to ensure that even a driver who is not accustomed to driving can reach a target location, calculates the distance in which the vehicle can stop based on the current vehicle speed and superposes a stoppable range on a map along with the target location. When calculating the stoppable range, the in-vehicle navigation device detects the speed of the vehicle and obtains, with respect to the detected speed, the distance in which the vehicle can stop through an ideal decelerating operation. The stoppable range is obtained in consideration of, in addition to the speed of the vehicle, vehicle information such as the weight of the vehicle, road surface information, the time range within which the driver is driving, or the driver's habits in a decelerating operation. The stoppable range is presented, in a diagram of which the width increases gradually toward the ideal stop position, in colors that match the degree of deceleration.

Patent Literature 2 discloses a method in which, when presenting a driver with a video from a camera while a vehicle moves rearward, an area that the vehicle may cover before coming to a stop based on the vehicle speed held at that time is obtained as a risk region and this risk region is presented on top of an image. When the risk region is calculated, brake-related characteristics, such as the weight of the vehicle, the road surface condition, or the braking operation of the driver, are taken into consideration in addition to the vehicle speed. Moreover, the free running distance that the vehicle covers from the point of recognition to the actual braking may also be taken into consideration. The risk region is presented, aside from being indicated by a frame, through flashing, in a stripe pattern, or by an arrow.

Meanwhile, what is presented on top of a map according to Patent Literature 1 is merely information indicating the distance that the vehicle travels to reach a target location, and the superposed range itself does not indicate the region that the vehicle body passes through from the start of the braking operation to the vehicle coming to a stop. Patent Literature 1 further indicates that data on the roads or facilities included in the stoppable range is displayed in a manner that makes them noticeable. However, it is not that this display presents an object that the vehicle may collide with, and the display merely presents a target object that serves as a reference when the driver stops the vehicle. As such, this display is not intended to prevent a collision. Therefore, the technique according to Patent Literature 1 cannot provide assistance for preventing a collision with an obstruction.

The technique according to Patent Literature 2 presents a region that the vehicle may pass through before coming to a stop as a risk region. However, the risk region is merely superposed on an image, and thus the technique does not allow a driver to easily grasp the possibility that the vehicle may collide with an object displayed on the image. In particular, as the distance from the vehicle to the position of an object becomes greater, the angle of depression from a camera becomes shallower, and this makes it more difficult to grasp the distance. Therefore, it becomes difficult for the driver to determine whether the object is included in the risk region by looking at the image. Since it is not that the technique according to Patent Literature 2 detects an obstruction, the technique cannot saliently display an obstruction that the vehicle may collide with or provide an alert for avoiding a collision. Moreover, Patent Literature 2 is silent as to detecting an object that the vehicle may collide with and providing a presentation in consideration of a measurement error in the position of the object or as to determining the possibility that an object may collide with the vehicle in consideration of the relative speed of the object with respect to the vehicle. Therefore, the technique according to Patent Literature 2 has shortcomings in that the technique had difficulty in properly assisting the driver if there is an error in the estimated position of an object or if an object that may collide with the vehicle is moving.

In contrast, the image presentation device 1 according to the present disclosure is configured as described above and thus generates a superposed image that displays the position of a detected object estimated to have a possibility of overlapping the pre-stop moving range more saliently than the positions of other detected objects. Herein, the expression "have a possibility of overlapping a pre-stop moving range" may encompass a case where when, for example, there is an error in the estimated position of an object, this error range overlaps the pre-stop moving range. In addition, the expression "have a possibility of overlapping a pre-stop moving range" may encompass a case where an object, if it is moving, may collide with the vehicle. Therefore, as the driver is presented with a generated superposed image, the driver can grasp, at an early stage, the urgency of an object colliding with the vehicle and take a certain action to avoid a collision between the vehicle and the object before the vehicle comes to a stop. Accordingly, the image presentation device 1 according to the present disclosure can provide assistance for preventing a collision between the vehicle and an obstruction before the vehicle comes to a stop.

First Example Embodiment

Hereinafter, some example embodiments will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 2:
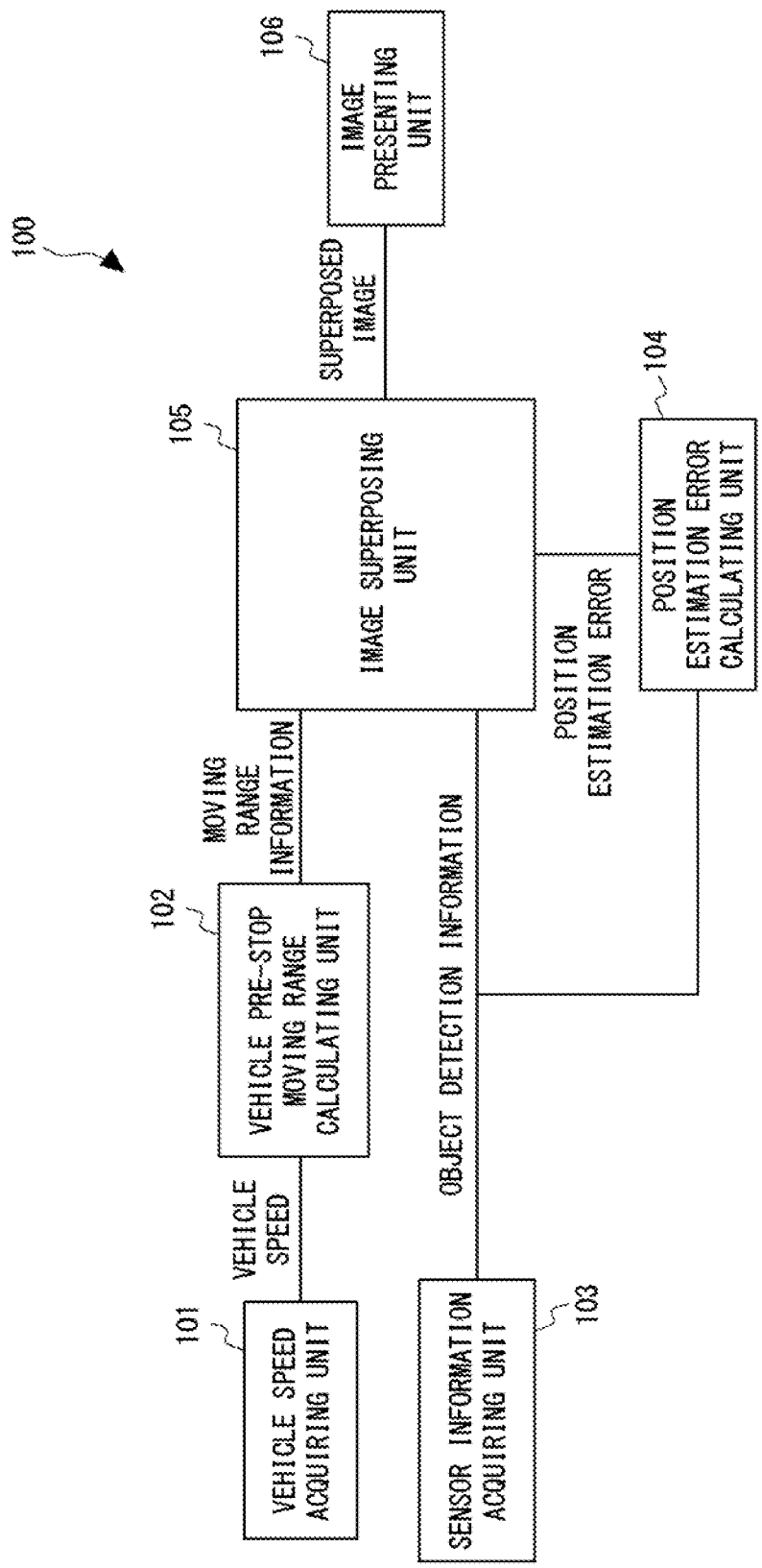
FIG. 2 illustrates a configuration of an image presentation device according to a first example embodiment.
Figure 3:
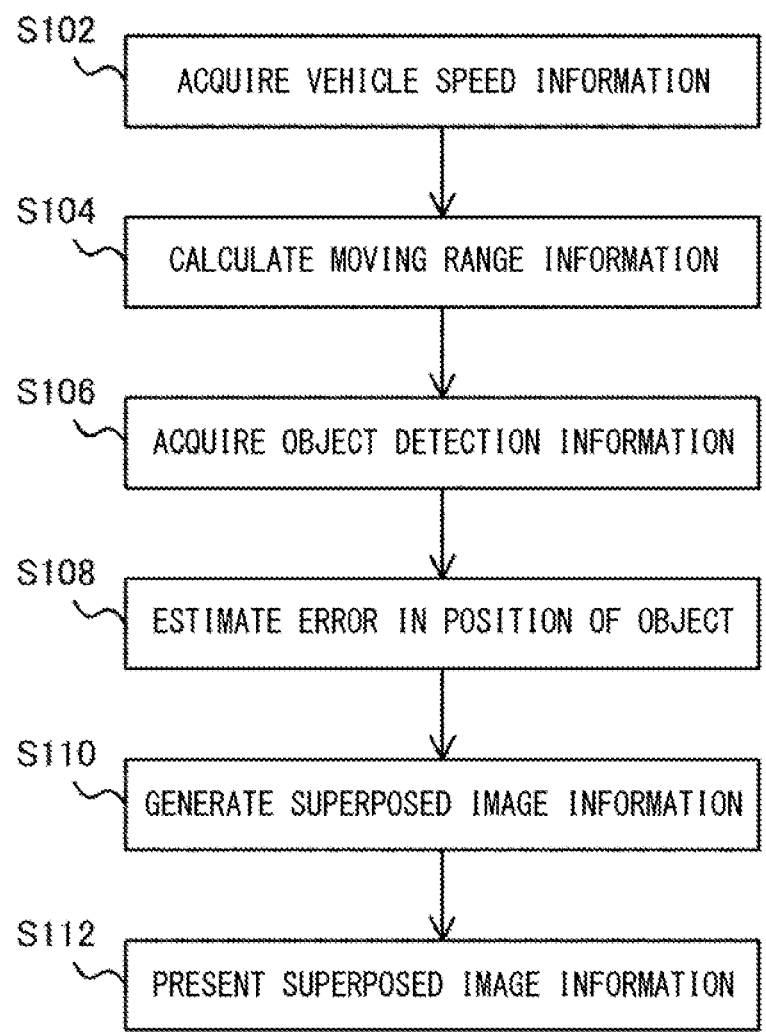
FIG. 3 is a flowchart illustrating an image presentation method executed by the image presentation device according to the first example embodiment.

FIG. 2 illustrates a configuration of an image presentation device 100 according to a first example embodiment. FIG. 3 is a flowchart illustrating an image presentation method executed by the image presentation device 100 according to the first example embodiment. The image presentation device 100 corresponds to the image presentation device 1 illustrated in FIG. 1 and functions as a vehicle surrounding object presentation device that presents information regarding an object or objects in the surroundings of a vehicle (this applies in a similar manner in other example embodiments).

The image presentation device 100 according to the first example embodiment includes a vehicle speed acquiring unit 101, a vehicle pre-stop moving range calculating unit 102, a sensor information acquiring unit 103, a position estimation error calculating unit 104, an image superposing unit 105, and an image presenting unit 106. The vehicle speed acquiring unit 101 corresponds to the vehicle speed acquiring unit 2 illustrated in FIG. 1 and functions as a vehicle speed acquiring means. The vehicle pre-stop moving range calculating unit 102 corresponds to the moving range calculating unit 4 illustrated in FIG. 1 and functions as a vehicle pre-stop moving range calculating means. The sensor information acquiring unit 103 corresponds to the sensor information acquiring unit 6 illustrated in FIG. 1 and functions as a sensor information acquiring means.

The position estimation error calculating unit 104 functions as a position estimation error calculating means. The image superposing unit 105 corresponds to the image superposing unit 8 illustrated in FIG. 1 and functions as an image superposing means. The image presenting unit 106 corresponds to the image presenting unit 10 illustrated in FIG. 1 and functions as an image presenting means.

The vehicle speed acquiring unit 101 acquires vehicle speed information indicating the speed of the vehicle and outputs the acquired vehicle speed information to the vehicle pre-stop moving range calculating unit 102 (step S102). The vehicle pre-stop moving range calculating unit 102 calculates moving range information based on the vehicle speed information and outputs the calculated moving range information to the image superposing unit 105 (step S104). The moving range information indicates a range within which the vehicle may move before coming to a stop upon the driver stepping on the brake at the vehicle speed indicated by the vehicle speed information. The sensor information acquiring unit 103 detects an object by use of a sensor to acquire object detection information and outputs the object detection information to the image superposing unit 105 and the position estimation error calculating unit 104 (step S106). The position estimation error calculating unit 104 estimates an error in the position of the detected object (calculates a position estimation error) and outputs position estimation error information indicating the estimated error to the image superposing unit 105 (step S108). The image superposing unit 105 generates a superposed image and outputs superposed image information indicating the superposed image to the image presenting unit 106 (step S110). In the superposed image, the moving range information, the object detection information, and the position estimation error information are superposed on each other. The image presenting unit 106 presents (displays) the superposed image information output from the image superposing unit 105 (step S112).

Next, a specific operation of the image presentation device 100 illustrated in FIG. 2 will be described. The vehicle speed acquiring unit 101 acquires vehicle speed information of a vehicle (referred to below as a host vehicle) provided with the image presentation device 100. The vehicle speed acquiring unit 101 can acquire the vehicle speed information by use of, for example, a vehicle speed sensor provided in the vehicle. The acquired vehicle speed information is output to the vehicle pre-stop moving range calculating unit 102.

Based on the vehicle speed information, the vehicle pre-stop moving range calculating unit 102 calculates a range that the vehicle may cover (i.e., move) and pass through if the vehicle initiates a decelerating operation at that point (referred to below as a pre-stop moving range or simply a moving range). For example, if the vehicle starts decelerating at a uniform acceleration of −a (a>0 in this case) when the vehicle speed held at that time is v, a distance d that the vehicle travels before coming to a stop is provided through the following expression 1.

[Math. 1]

$$d = \frac{v^2}{2a} \quad (1)$$

Figure 4:
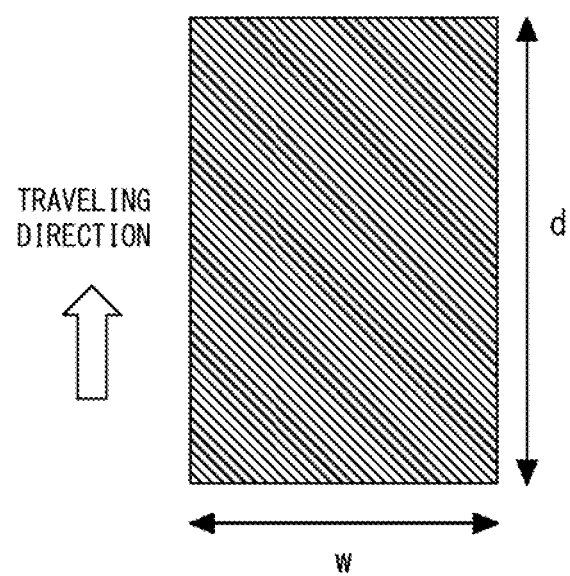
FIG. 4 illustrates an example of a moving range within which a vehicle moves before coming to a stop.
Figure 5:
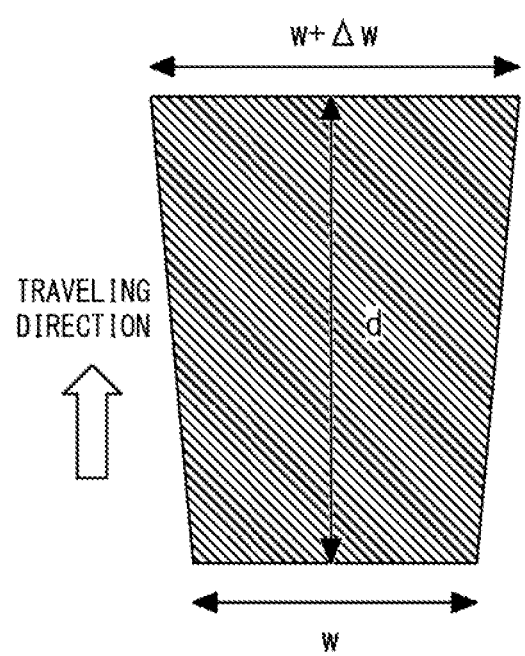
FIG. 5 illustrates another example of a moving range within which a vehicle moves before coming to a stop.
Figure 6:
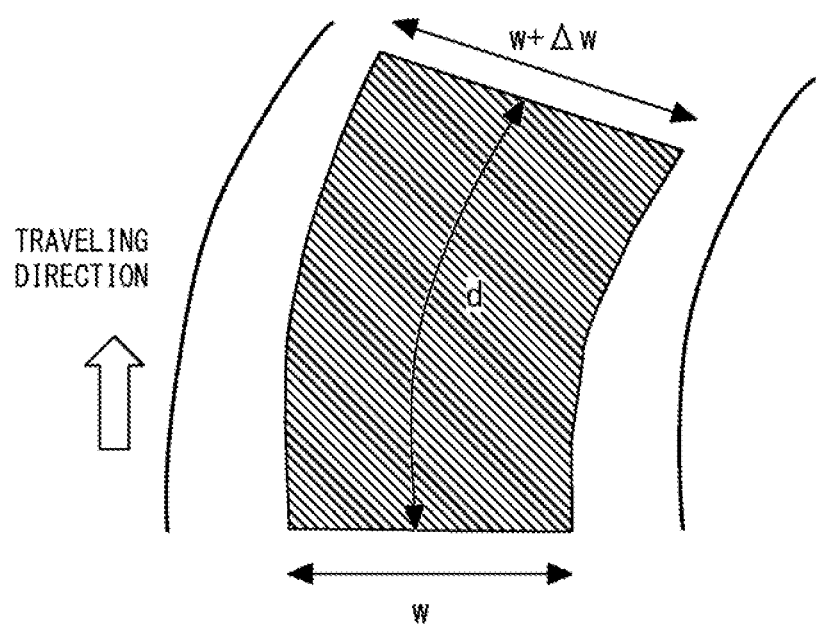
FIG. 6 illustrates another example of a moving range within which a vehicle moves before coming to a stop.

FIGS. 4 to 6 illustrate examples of some moving ranges within which the vehicle moves before coming to a stop.

With an assumption that the vehicle moves straight ahead till coming to a stop, as illustrated in FIG. 4, a rectangular region defined by a vehicle width w and the distance d provided by the expression 1 serves as the pre-stop moving range. In this manner, the pre-stop moving range (the moving range) is determined basically by the vehicle width w and the distance d that the vehicle travels before coming to a stop.

However, it is not that the vehicle always moves straight ahead, and the pre-stop moving range may thus be made wider as the distance from the vehicle is greater. For example, as illustrated in FIG. 5, the pre-stop moving range may be shaped like a trapezoid where the width is wider by Aw at the end on the traveling direction. In this case, Aw by which the width is increased may take a preset value. Alternatively, Aw may be calculated by estimating the degree by which the traveling direction of the vehicle wobbles sideways based on the driving history of the driver. In other words, Aw may be set greater for a driver with a tendency where the traveling direction wobbles sideways by a large degree than for a normal driver. In this example, the degree by which the traveling direction wobbles sideways can be determined by acquiring the driving history and obtaining an average wobbling.

Alternatively, it is conceivable that the vehicle is highly likely to travel along the road. Therefore, if the current position and the map information can also be acquired, the pre-stop moving range may be determined in accordance with the shape of the road. For example, if the road curves to the right as illustrated in FIG. 6, the pre-stop moving range may be curved in accordance with the curve of the road.

As can be seen from the expression 1, the distance d that the vehicle moves before coming to a stop varies depending not only on the vehicle speed v but also on the acceleration a. A preset value may be used for the acceleration a. Alternatively, the value of the acceleration a may vary depending on the condition of the road surface, the slope of the road, or the like. Therefore, if information indicating whether the road surface is wet, weather information, or information regarding the slope of the road can also be acquired, the acceleration may be determined in consideration of these pieces of information as well. In other words, if the road surface is wet, frozen, or covered by snow, for example, the vehicle pre-stop moving range calculating unit 102 may obtain the value of the distance d by use of an acceleration with an absolute value smaller than that to be used in a normal situation.

The acceleration may also vary depending on the driver's habit in a decelerating operation—for example, how firmly the driver steps on the brake when he or she steps on the brake—or the weight of the vehicle including the occupant or occupants and any load. Therefore, the vehicle pre-stop moving range calculating unit 102 may monitor the vehicle speed, record the history of the speed and the acceleration up to the point of braking, and calculate the value of the acceleration to be held at the time of the decelerating operation through a statistical process. For example, the mean value, the median value, or the modal value of the acquired values can be used.

The assumption in the foregoing is that the acceleration is the uniform acceleration, but the acceleration does not have to be the uniform acceleration. For example, as it is conceivable that the driver steps on the brake in several stages, the acceleration may also change accordingly. In this case, if the speed is expressed as a function v(t) of the time t and the current time is to, the distance d that the vehicle moves before coming to a stop is calculated through the following expression 2.

[Math. 2]

$$d=\int_0^\tau v(t_0+t)dt \quad (2)$$

In the above, the time $\tau$ is the time it takes for the speed to become 0, that is, the time required for the vehicle to come to a stop (referred to below as a pre-stop elapsed time) and is a value that satisfies the following expression 3.

[Math. 3]

$$v(t_0+\tau)=0 \quad (3)$$

Therefore, the vehicle pre-stop moving range calculating unit 102 may obtain the function v(t) by learning, from the history information of the vehicle speed, the tendency in the change over time in the vehicle speed when the driver engages in a decelerating operation and use the obtained function v(t) to calculate the pre-stop moving range.

Figure 7:
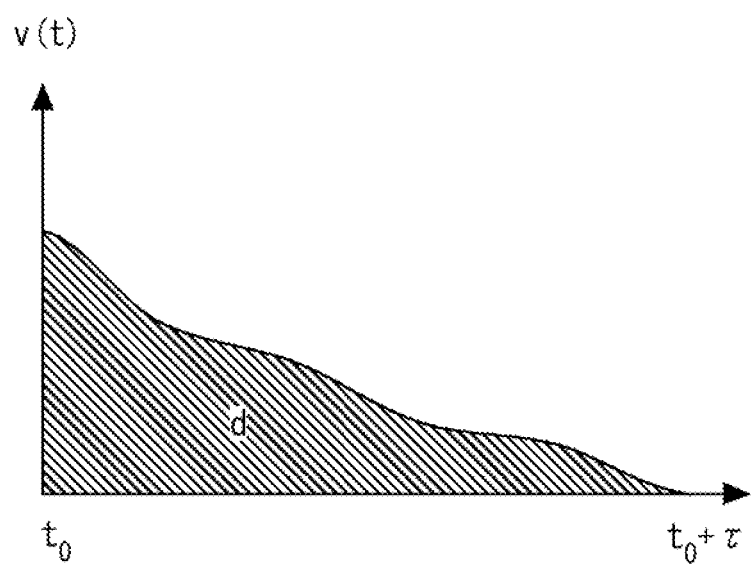
FIG. 7 is a graph illustrating an example of a change in the speed observed from the start of a braking operation to the vehicle coming to a stop.

FIG. 7 is a graph illustrating an example of a change in the speed observed from the start of a braking operation to the vehicle coming to a stop. In the example illustrated in FIG. 7, the braking operation starts at a time $t_0$. In other words, the driver steps on the brake at the time $t_0$. If the function v(t) is a function related to the graph illustrated in FIG. 7, the vehicle pre-stop moving range calculating unit 102 can calculate the distance d by obtaining the area of the shaded portion.

The vehicle pre-stop moving range calculating unit 102 may obtain the distance d in consideration of a so-called free running distance v∆t. The free running distance v∆t is a distance that the vehicle moves in ∆t spanning from when the driver recognizes the need to step on the brake to when the driver actually steps on the brake. In other words, the vehicle pre-stop moving range calculating unit 102 may extend the distance d by the amount of the free running distance v∆t.

The vehicle pre-stop moving range calculating unit 102 may calculate a plurality of pieces of moving range information. For example, the vehicle pre-stop moving range calculating unit 102 may calculate the moving range information indicating the pre-stop moving range for each of a plurality of accelerations and output the calculated plurality of pieces of moving range information. Moreover, the vehicle pre-stop moving range calculating unit 102 may add pre-stop elapsed time information indicating the pre-stop elapsed time $\tau$ to the moving range information. If the acceleration is −a and is constant, the pre-stop elapsed time $\tau$ can be obtained through $\tau=v/a$. The vehicle pre-stop moving range calculating unit 102 may obtain the pre-stop elapsed time $\tau$ by learning the tendency in the decelerating operation of the driver from the history information of the vehicle speed. The moving range information calculated in this manner is output to the image superposing unit 105.

The sensor information acquiring unit 103 acquires position information of an object (a detected object) detected by a sensor. In this example, the sensor is a sensor attached to the vehicle in order to detect an object present in the surroundings of the vehicle, and examples of such a sensor include a millimeter-wave radar, a Light Detection and Ranging (LiDAR), or a camera. The sensor, however, is not limited to the above and may be any sensor used for the aforementioned purpose. Information indicating the object detected by such a sensor is output as object detection information.

The object detection information may include different information depending on the type of the sensor used but includes at least position information of the detected object. In this example, the position information may be calculated in the coordinates relative to the position of the host vehicle. In other words, the position information of the detected object is converted into coordinate values on the coordinate system (referred to below as the host vehicle relative coordinate system) defined based on the reference position of the host vehicle, and the resulting coordinate values are output.

Figure 8:
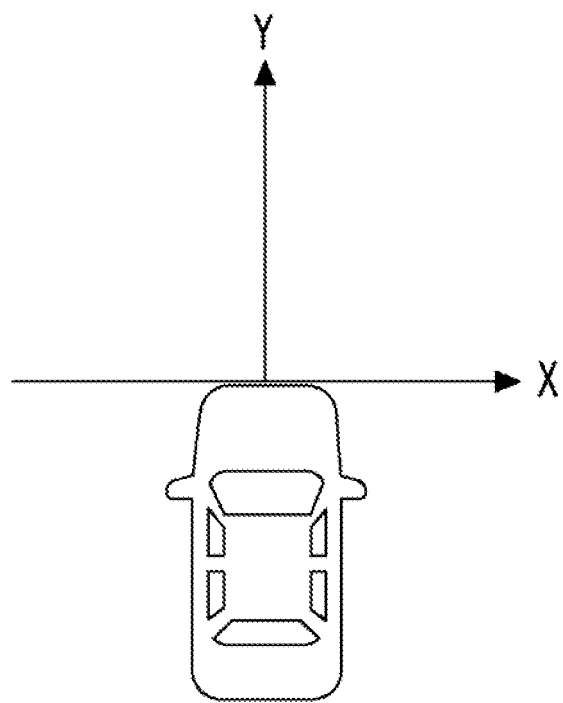
FIG. 8 illustrates an example of a host vehicle relative coordinate system.

FIG. 8 illustrates an example of the host vehicle relative coordinate system. As illustrated in FIG. 8, the host vehicle relative coordinate system is a coordinate system in which the origin lies at the center of the front portion of the vehicle, the X-axis extends in the widthwise direction of the vehicle (the right direction corresponds to the positive side), and the Y-axis extends in the front-back direction of vehicle (the front direction corresponds to the positive side). If the sensor is a millimeter-wave radar, the distance from the sensor and the direction relative to the sensor are acquired for each detected object. This acquired position information is converted to the host vehicle relative coordinate system described above, and the resulting coordinate values are output. If the sensor is a camera, a captured image is subjected to an object detection process, and the object position on the image is acquired. This object position is converted to the real world coordinate system by use of camera parameters acquired through calibration or the like, the resulting values are further converted to the host vehicle relative coordinate system described above, and the resulting coordinate values are output.

The object detection information may include, aside from the position information, information indicating the size or the height of the object or any other attribute information. For example, if the sensor is a camera, the value of the size and the height of the object may also be acquired from the result of detecting the object. Alternatively, the object detection information may include information related to the feature of the object's appearance (a visual feature), such as the color of or the pattern on the object.

If a plurality of objects have been detected, the object detection information may include pieces of information on the objects corresponding to the number of the detected objects. For example, if N objects have been detected, the object detection information includes N pieces of object information including the position information of each object. In this case, the sensor information acquiring unit 103 appends an object ID to each detection result so that it is possible to identify which detection result corresponds to which object. The object detection information obtained in this manner is output to the position estimation error calculating unit 104 and the image superposing unit 105.

The position estimation error calculating unit 104 calculates an estimation error in the position (a position estimation error) of each detected object. The position estimation error calculating unit 104 outputs position estimation error information indicating the calculated position estimation error to the image superposing unit 105. In this example, the position estimation error is information for estimating the degree of spatial error of the observed position information.

The magnitude of an error generally depends on the position of the observed object. For example, if the sensor is a millimeter-wave radar, an observation error may arise in each of information indicating the distance to the detected object and information indicating the direction of the object. The error in the angular direction (the horizontal direction) is greater as the distance from the sensor to the object is greater. The position estimation error calculating unit 104 creates a model representing the tendency of such an error and stores this model therein. Then, the position estimation error calculating unit 104 calculates, by use of this model, the degree of an error that may be included in the position coordinates of this object based on the position where the object is observed.

For example, if the sensor is a millimeter-wave radar, the position estimation error calculating unit 104 calculates an error in the distance direction and an error in the angular direction for each detected object and outputs the calculated errors as position estimation error information. Meanwhile, if the sensor is a camera, the angle of depression to the detected object is smaller as the distance from the vehicle is greater. Therefore, the position estimation error is more likely to occur in the distance direction (the depthwise direction). In other words, the position estimation error in the depthwise direction is greater as the distance from the vehicle is greater. Therefore, the position estimation error calculating unit 104 creates a model representing the tendency of such an error and stores this model therein. Then, the position estimation error calculating unit 104 can calculate the error by use of this model based on the position where the object is observed. The position estimation error information of each object calculated for each object in this manner is output to the image superposing unit 105.

The image superposing unit 105 generates a superposed image in which the moving range information, the position information of each detected object, and the position estimation error information of each detected object are superposed on each other. Some examples of such a superposed image according to the first example embodiment will be described below.

Figure 9:
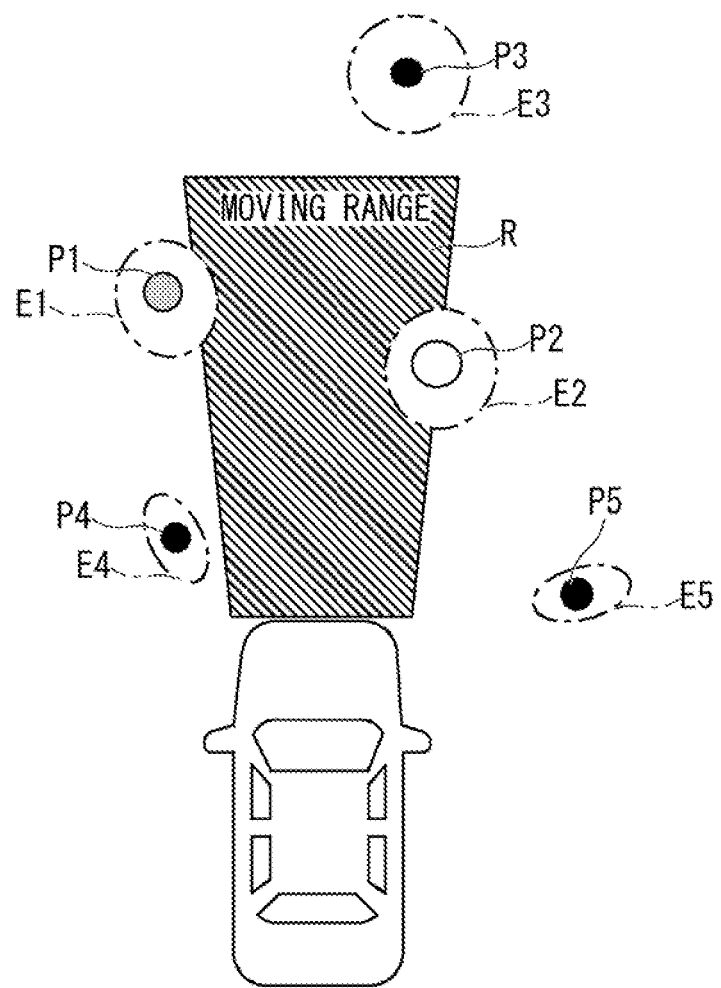
FIG. 9 illustrates an example of a superposed image according to the first example embodiment.
Figure 10:
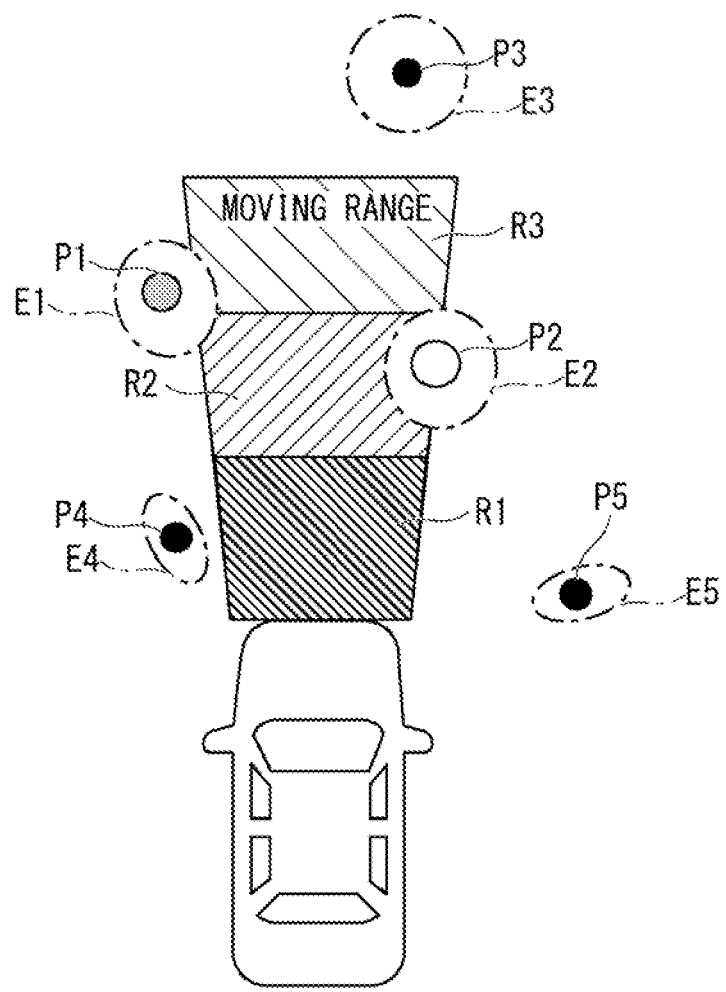
FIG. 10 illustrates another example of a superposed image according to the first example embodiment.

FIGS. 9 and 10 each illustrate an example of a superposed image according to the first example embodiment.

For example, the superposed image illustrated in FIG. 9 displays, with the position of the host vehicle lying at the center, the position of each object detected in the surroundings of the host vehicle as well as a moving range R (the region with hatching in FIG. 9) within which the host vehicle may move before coming to a stop. In FIG. 9, positions P1 to P5 indicated by the respective circles represent the positions of the detected objects. Meanwhile, ellipses E1 to E5 indicated by the respective dashed-dotted lines surrounding the positions P1 to P5 represent the estimation errors of the positions P1 to P5 of the respective objects.

If, among the detected objects, an ellipse indicating its corresponding estimation error overlaps the moving range R, the image superposing unit 105 displays the object saliently as the object that may collide with the vehicle. In the example illustrated in FIG. 9, the respective objects corresponding to the positions P1 and P2 are the detected objects that may collide with the vehicle. Therefore, the image superposing unit 105 displays the marks indicating the positions P1 and P2 in a noticeable color (e.g., red). Alternatively, the image superposing unit 105 may display the marks indicating the positions P1 and P2 each with a large circle.

Moreover, as the detected object is in an area closer to the vehicle, the time in which the vehicle would collide with the object is shorter (or the vehicle may collide with the object even if the driver has stepped on the brake). Therefore, the image superposing unit 105 displays the position indicating such an object more saliently. Alternatively, as the object is located further inward in the moving range and close to the vehicle, the possibility that the vehicle collides with that object is higher. Therefore, the image superposing unit 105 may display the mark indicating the position of such an object more saliently. The method of making the display salient may include, aside from the methods described above, making the mark indicating the position of an object flash or superposing a text calling for an attention (warning information) on the image.

The superposed image illustrated in FIG. 10 presents the moving range in a plurality of stages. If the moving range information indicating a plurality of pre-stop moving ranges corresponding to the respective accelerations is output from the vehicle pre-stop moving range calculating unit 102, the image superposing unit 105 can present the pre-stop moving range in stages as above. In the superposed image illustrated in FIG. 10, three moving ranges R1 to R3 corresponding to the braking at three different intensities (the absolute values of the accelerations) are superposed. The moving range R1 with the darkest hatching represents the moving range to be held when the absolute value of the acceleration is the greatest (when the driver steps on the brake firmly). In the example illustrated in FIG. 10, the moving ranges in the three stages are illustrated discontinuously, but the borders between the regions may be shown to change continuously. With regard to the method of presenting the regions, not only the intensity of the colors but also the colors themselves may be varied. For example, the moving range R1 may be shown in red, the moving range R2 may be shown in orange, and the moving range R3 may be shown in yellow. In other words, the display mode of the moving ranges may be varied in stages. Such a manner of presentation makes it easier for the driver to determine the urgency for braking and how firmly he or she should step on the brake.

If the current position information of the host vehicle and the map information of the surroundings of the vehicle are available through the use of, for example, a Global Positioning System (GPS) or a quasi-zenith satellite, the image superposing unit 105 may generate a superposed image such that the superposed image is superposed on the current position on the map scaled to the map. In this case, if the detected object is mapped to (i.e., associated to) an object on the map, the image superposing unit 105 may generate a superposed image such that the detected object is mapped to (i.e., associated to) the object on the map. This configuration makes it possible to provide the driver with the information on his or her surroundings more appropriately.

The image presenting unit 106 performs a process for displaying a superposed image (superposed image information) on a predetermined monitor (an input/output interface 1100 described later or the like) and presenting the driver or a passenger with information on the object or objects in the surroundings of the host vehicle. For example, if the image presentation device 100 is embedded as a part of a car navigation device, the image presenting unit 106 displays generated superposed image information on a screen of the car navigation device. If there is an object that may collide with the vehicle, the image presenting unit 106 may present the superposed image information on the screen and also output a warning through a warning sound or some other sounds calling for the driver's attention from a sound presenting means (e.g., a loudspeaker) associated with the image presenting unit 106.

In this manner, the image presentation device 100 according to the first example embodiment calculates the pre-stop moving range corresponding to the current vehicle speed and displays the pre-stop moving range and the position of the object detected in the surroundings of the vehicle superposed on each other. Then, the image presentation device 100 estimates an error in the position of the object to display the position estimation error information indicating the estimated error superposed on the image and saliently displays an object that may collide with the vehicle before the vehicle comes to a stop. This configuration makes it possible to appropriately provide the driver with the information regarding the obstructions and the like in the surroundings of the vehicle. As a result, the possibility of preventing a collision with an object that could collide with the vehicle before the vehicle comes to a stop can be increased.

The image presentation device 100 according to the first example embodiment estimates an error in the position of an object to display the position estimation error information indicating the estimated error superposed on the image. Then, the image presentation device 100 superposes the pre-stop moving range, the position of the object included in the object detection information, and the position estimation error information on top of each other on the screen. If the position estimation error information overlaps the pre-stop moving range, the image presentation device 100 displays the position of this detected object saliently. As an error in the measurement of an object (an obstruction) is taken into consideration, the above configuration can provide the driver with information regarding the obstructions and the like in the surroundings of the vehicle more reliably and more appropriately. As a result, the possibility of preventing a collision more reliably can be increased.

Second Example Embodiment

Next, a second example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 11:
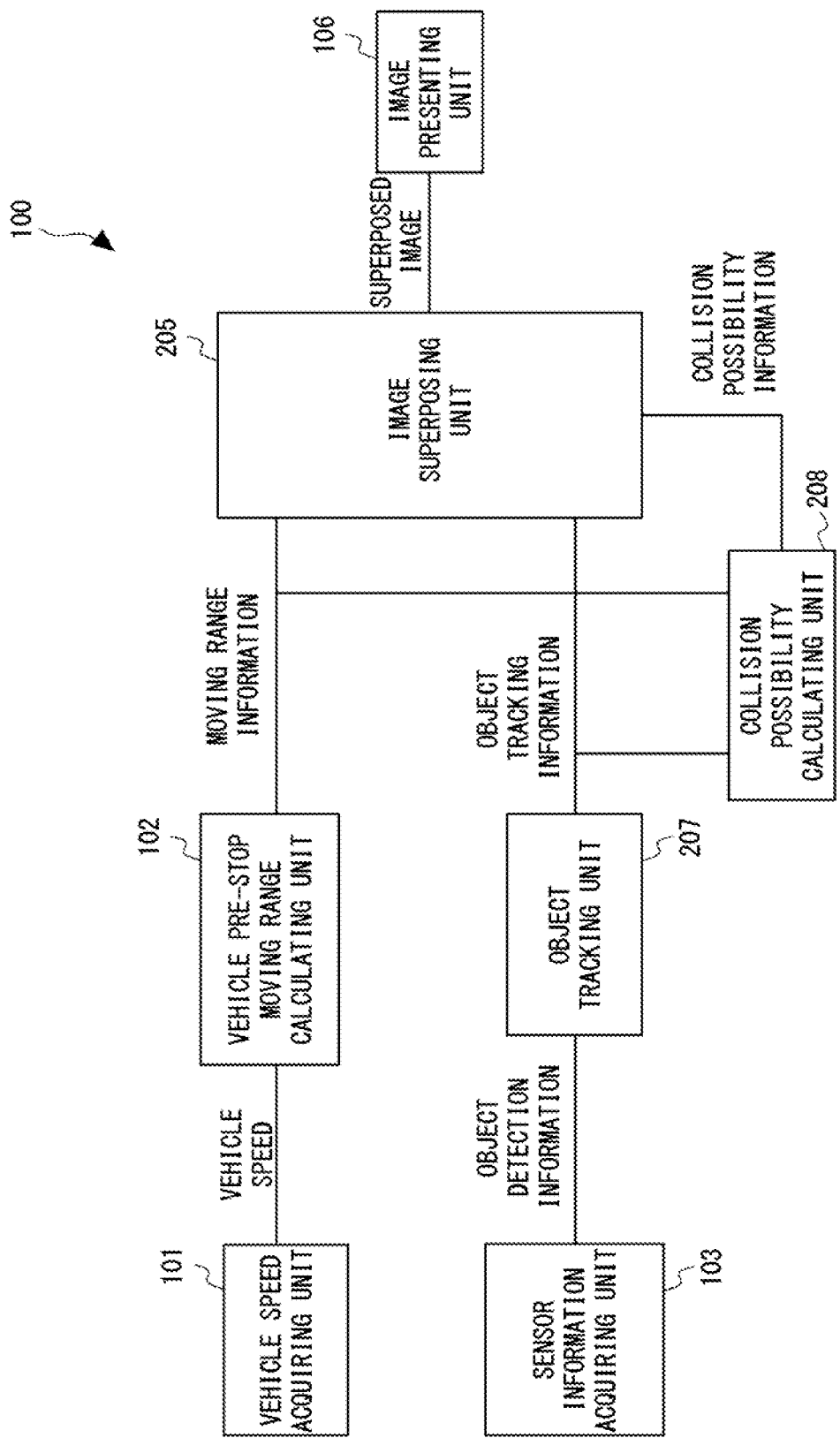
FIG. 11 illustrates a configuration of an image presentation device according to a second example embodiment.

FIG. 11 illustrates a configuration of an image presentation device 100 according to the second example embodiment. The image presentation device 100 according to the second example embodiment includes a vehicle speed acquiring unit 101, a vehicle pre-stop moving range calculating unit 102, a sensor information acquiring unit 103, an object tracking unit 207, a collision possibility calculating unit 208, an image superposing unit 205, and an image presenting unit 106. The object tracking unit 207, the collision possibility calculating unit 208, and the image superposing unit 205 function as, respectively, an object tracking means, a collision possibility calculating means, and an image superposing means. As compared to the image presentation device 100 according to the first example embodiment illustrated in FIG. 2, the image presentation device 100 according to the second example embodiment does not include the position estimation error calculating unit 104, additionally includes the object tracking unit 207 and the collision possibility calculating unit 208, and includes the image superposing unit 205 in place of the image superposing unit 105.

Figure 12:
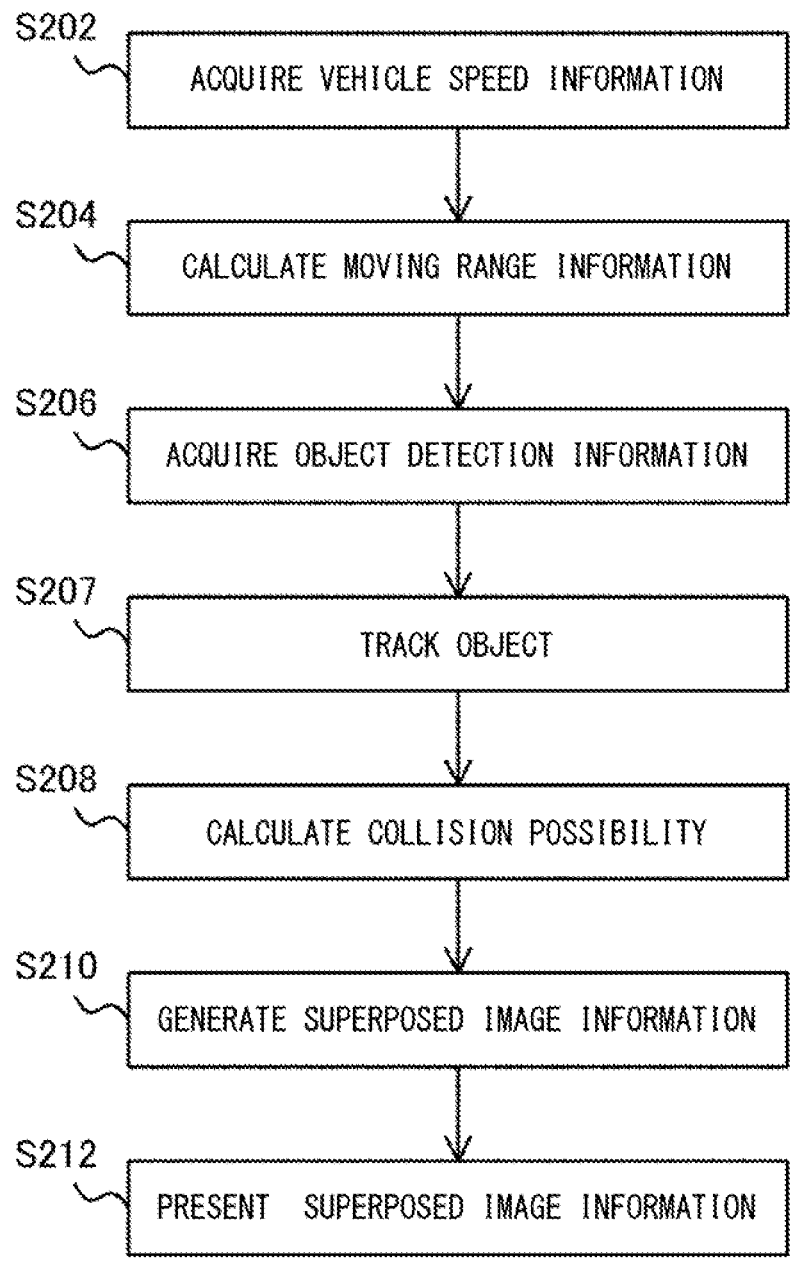
FIG. 12 is a flowchart illustrating an image presentation method executed by the image presentation device according to the second example embodiment.

FIG. 12 is a flowchart illustrating an image presentation method executed by the image presentation device 100 according to the second example embodiment. The vehicle speed acquiring unit 101 acquires vehicle speed information indicating the speed of the vehicle and outputs the acquired vehicle speed information to the vehicle pre-stop moving range calculating unit 102 (step S202). The vehicle pre-stop moving range calculating unit 102 calculates moving range information (a pre-stop moving range) based on the vehicle speed information and outputs the calculated moving range information to the image superposing unit 205 and the collision possibility calculating unit 208 (step S204). The sensor information acquiring unit 103 detects an object by use of a sensor to acquire object detection information and outputs the acquired object detection information to the object tracking unit 207 (step S206). The object tracking unit 207 generates object tracking information by tracking the object based on the object detection information and outputs the generated object tracking information to the image superposing unit 205 and the collision possibility calculating unit 208 (step S207). The collision possibility calculating unit 208 calculates the possibility of a collision with each tracked object based on the moving range information and the object tracking information and outputs collision possibility information indicating the possibility of a collision to the image superposing unit 205 (step S208). The image superposing unit 205 generates a superposed image and outputs superposed image information indicating the superposed image to the image presenting unit 106 (step S210). In the superposed image, the moving range information, the object tracking information, and the collision possibility information are superposed on each other. The image presenting unit 106 presents (displays) the superposed image information output from the image superposing unit 205 (step S212).

Next, a specific operation of the image presentation device 100 according to the second example embodiment illustrated in FIG. 11 will be described. It is to be noted that operations of the vehicle speed acquiring unit 101, the vehicle pre-stop moving range calculating unit 102, the sensor information acquiring unit 103, and the image presenting unit 106 are substantially the same as those of the counterparts in the image presentation device 100 according to the first example embodiment illustrated in FIG. 2.

According to the second example embodiment, however, the moving range information includes the pre-stop elapsed time described above.

The object tracking unit 207 performs a detection result-based tracking process known as tracking by detection based on the object detection information output from the sensor information acquiring unit 103. Specifically, the object tracking unit 207 determines whether each object to be tracked included in the object tracking result obtained by the time (a sampling time) immediately preceding the current time can be mapped to (i.e., associated to) a detected object in the object detection result of the current time. Then, the object tracking unit 207 updates the object tracking result. At this point, the object tracking unit 207 may map (i.e., associate) the position of each object to be tracked to a detected object at the current time after predicting the position of each object through a Kalman filter or a particle filter.

If an object to be tracked and a detected object are mapped to each other, the object tracking unit 207 updates information regarding the object to be tracked (the object tracking result) by use of information regarding the detected object mapped to the object to be tracked. Meanwhile, if a detected object fails to be mapped to any of the objects to be tracked, it is highly likely that this detected object is a newly observed object. Therefore, the object tracking unit 207 generates a new object to be tracked corresponding to the detected object and adds the newly generated object to be tracked to the object tracking result. Conversely, if there is an object to be tracked that is not mapped to any of the detected objects, it is conceivable that this object to be tracked has disappeared as this object has gone outside the detection region of the sensor, for example. Therefore, the object tracking unit 207 performs a process of deleting this object to be tracked from the object tracking result. In this case, the object tracking unit 207 may delete this object to be tracked if this object has failed to be mapped to any detected object several times, instead of deleting this object after the object fails to be mapped to any detected object only once.

For the control described above, the object tracking unit 207 may define the likelihood indicating the certainty of an object to be tracked. Then, the object tracking unit 207 may raise the likelihood if an object to be tracked and a detected object are mapped to each other after the object to be tracked has been newly generated. Meanwhile, if an object to be tracked fails to be mapped to any detected object, the object tracking unit 207 may lower the likelihood and delete the object to be tracked when the likelihood has fallen below a predefined value. When this likelihood is calculated, not only the information indicating whether a detection result and an object to be tracked are mapped to each other but also the certainty in the mapping between the detection result and the object to be tracked may be taken into consideration. In this manner, the object tracking unit 207 generates an object tracking result at the current time and outputs the generated object tracking result as object tracking information.

In this example, the object tracking information includes, for each object to be tracked, the position (the relative position) of the object on the host vehicle relative coordinate system, the ID information appended to each object to be tracked, and the ID information of the detected object mapped to the object to be tracked. If an object to be tracked fails to be mapped to any detected object, the object tracking information may include, instead of the ID information of the detected object, information indicating that no mapping is available.

The object tracking unit 207 also holds a tracking history from some time earlier and calculates the relative speed of the object with respect to the host vehicle based on this tracking history. Then, the object tracking unit 207 outputs object tracking information including the relative speed. Moreover, if the object tracking unit 207 can also obtain information regarding an estimation error of the position as in a tracking with a Kalman filter, the object tracking unit 207 may output this information as well.

The collision possibility calculating unit 208 predicts the position where each object to be tracked will be located when the pre-stop elapsed time has elapsed based on the object tracking information and the moving range information including the pre-stop elapsed time. The collision possibility calculating unit 208 determines whether there is a possibility that each object to be tracked collides with the vehicle based on the predicted position and the moving range. Then, the collision possibility calculating unit 208 calculates the degree of the possibility of a collision as a collision possibility index.

For example, if a stationary object such as a pole for a sign installed on the road is detected and tracked as an object, the relative speed of this object has the same magnitude as the vehicle speed but in the opposite directions (i.e., the direction toward the host vehicle). In this case, no collision occurs as long as the position of such an object is outside the moving range (the pre-stop moving range). Therefore, the collision possibility calculating unit 208 can determine the possibility of a collision with such an object based on whether the object is within the moving range.

In contrast, if an object that moves toward the host vehicle, such as a bicycle approaching the host vehicle from the front, is detected and tracked as an object, the relative speed of this object has a greater absolute value than the relative speed of a stationary object. In the case of such an object, the object may collide with the host vehicle even if the position of that object is outside the moving range. In such a case, the collision possibility calculating unit 208 determines the possibility of a collision by determining whether there is a possibility that the object enters the moving range within the pre-stop elapsed time. When the pre-stop elapsed time in the moving range is denoted by $\tau$, the collision possibility calculating unit 208 calculates the position where the object to be tracked will be located when the time has passed by $\tau$ and determines the possibility of a collision based on whether the calculated position is within the moving range.

Specifically, when the speed of the host vehicle is $(v_x, v_y)$, the position where the object is located at the current time $t_0$ is $(X(t_0), Y(t_0))$, and the relative speed is $(u_x, u_y)$, the actual speed of the object $V=(V_x, V_y)$ is expressed by the following expression 4.

[Math. 4]

$$(V_x, V_y) = (v_x + u_x, v_y + u_y) \quad (4)$$

Therefore, the position coordinates of the object to be held when the time has passed by $\tau$ takes the values obtained by adding $V\tau$ to the current position and are thus expressed by the following expression 5.

[Math. 5]

$$(X(t_0 + \tau), Y(t_0 + \tau)) = (X(t_0) + V_x \tau, Y(t_0) + V_y \tau) \quad (5)$$

Therefore, the collision possibility calculating unit 208 can determine the possibility of a collision based on whether the position coordinates lie within the moving range (the pre-stop moving range). Then, as the position coordinates lie further inward within the moving range, the possibility that the object collides with the host vehicle is higher. Thus, the collision possibility calculating unit 208 calculates the value of the collision possibility index in accordance with the degree of the possibility of the collision. In other words, the collision possibility calculating unit 208 calculates the collision possibility index such that the collision possibility index takes a higher value as the position coordinates are located further inward within the moving range.

The position calculated through the expression 5 above is the position to be held if the speed of the object remains constant while the object moves. Therefore, if the speed of the object varies, the position of the object differs from the position calculated through the expression 5. Therefore, the collision possibility calculating unit 208 may calculate the position coordinates in consideration of a predetermined change in the speed and determine the possibility of a collision based on whether the calculated position coordinates lie within the moving range. If a plurality of pieces of pre-stop elapsed time information are output, the collision possibility calculating unit 208 may perform the calculation described above by use of one of these pieces of pre-stop elapsed time information (e.g., pre-stop elapsed time information with the longest pre-stop elapsed time). Alternatively, the collision possibility calculating unit 208 may calculate the mean of these pieces of information and then perform the calculation described above.

The collision possibility index takes a higher value as the possibility of a collision is higher. In this case, it is conceivable that the possibility that a given object and the vehicle collide with each other is higher as the value calculated for that object through the expression 5 corresponds to a position lying further inward in the moving range and closer to the vehicle. Therefore, the collision possibility calculating unit 208 may set a higher value of the collision possibility index for an object with a higher extent of moving inward in the moving range and with reaching closer to the vehicle.

The image superposing unit 205 generates a superposed image in which the moving range information and the position information of an object to be tracked are superposed on each other. In this case, the image superposing unit 205 displays an object with a higher possibility of a collision more saliently in consideration of the value of the possibility of a collision of each object. Some examples of such a superposed image according to the second example embodiment will be described below.

Figure 13:
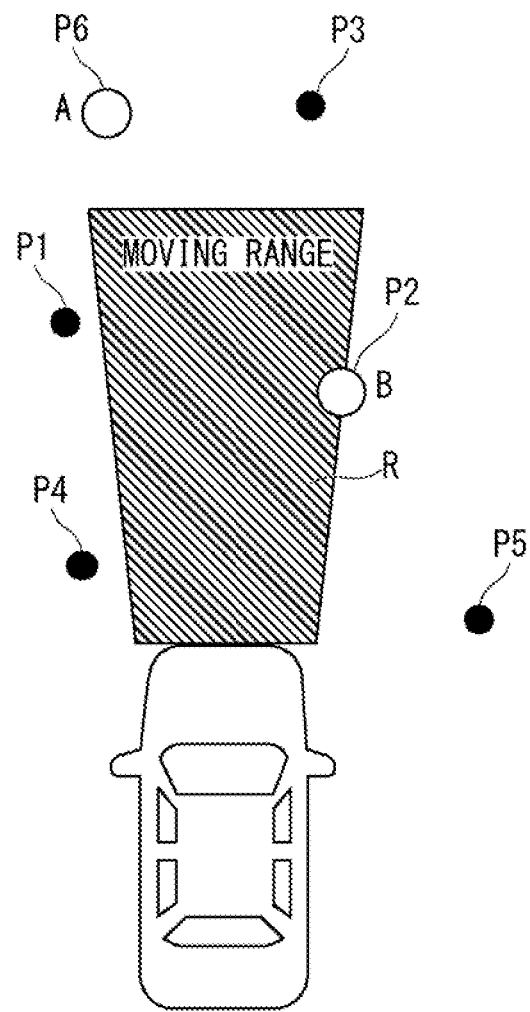
FIG. 13 illustrates an example of a superposed image according to the second example embodiment.
Figure 14:
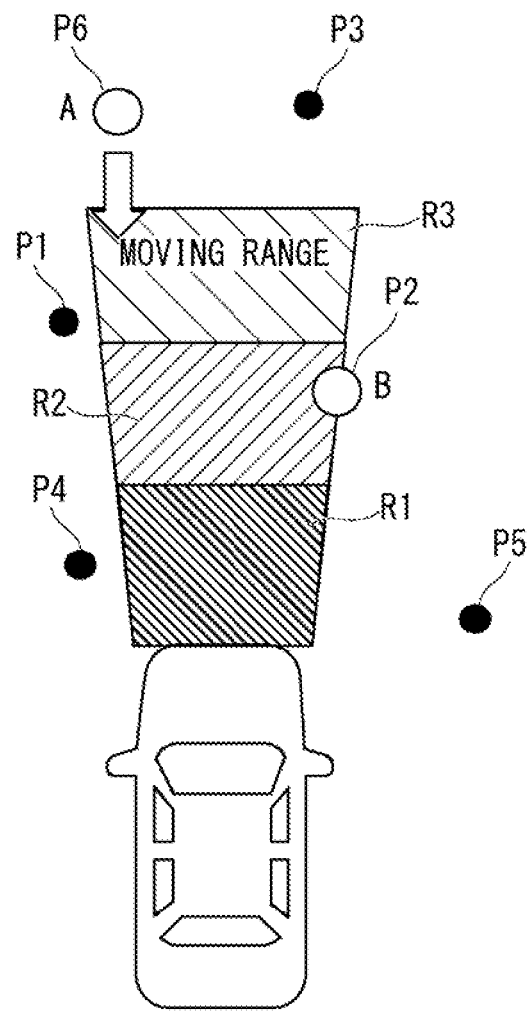
FIG. 14 illustrates another example of a superposed image according to the second example embodiment.
Figure 15:
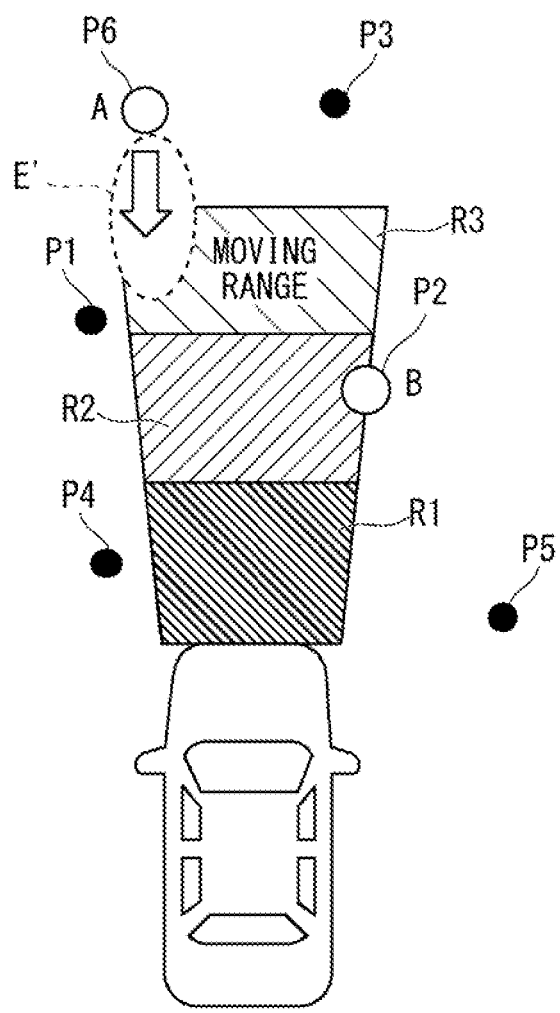
FIG. 15 illustrates another example of a superposed image according to the second example embodiment.

FIGS. 13 to 15 each illustrate an example of a superposed image according to the second example embodiment.

For example, the superposed image illustrated in FIG. 13 displays, with the position of the host vehicle lying at the center, the position of each object detected in the surroundings of the host vehicle as well as a moving range R (the region with hatching) in which the host vehicle may move before coming to a stop. In FIG. 13, positions P1 to P6 indicated by the respective circles represent the positions of the detected objects. Then, objects A and B (the positions P6 and P2) indicated by the open circles have each been determined to have a high possibility of a collision and are thus displayed saliently. The object B is a stationary object but lies within the moving range R. Therefore, the object B has a high possibility of colliding with the host vehicle. Meanwhile, the object A is located outside the moving range R but is an object moving toward the host vehicle. Therefore, the object A has a high value of the collision possibility index and is thus displayed saliently. In the example illustrated in FIG. 13, the position of each object with a possibility of a collision is displayed with a large circle and in a noticeable color. However, the method of displaying the position saliently is not limited to the above, and any other method of adding salience can be employed, as stated above in the description of FIGS. 9 and 10.

In the example illustrated in FIG. 14, the superposed image presents the moving range in a plurality of stages, as in the example illustrated in FIG. 10. Moreover, the moving direction of the object A (the position P6) is indicated by the arrow in order to indicate that this object is moving toward the host vehicle. Furthermore, this arrow itself is displayed saliently since there is a possibility that the object A enters the moving range before the vehicle comes to a stop. In this manner, the moving direction is additionally indicated for an object other than a stationary object, and this makes it easier for the driver to understand the reason why an object is displayed saliently and can provide information more appropriately.

In the example illustrated in FIG. 15, the superposed image indicates, with an ellipse E', a range within which the position may vary if it is assumed that the speed of the object A (the position P6) varies. This makes it easier to determine the urgency of a collision and increases the possibility of preventing a collision. Although the range is indicated by an ellipse in this example, the configuration can be such that only the worst value is displayed. In this case, the superposed image may present the position on the ellipse that is closest to the vehicle by an arrow or the like as the assumed stop position.

As with the image superposing unit 105 according to the first example embodiment, if the position information of the host vehicle and the map information are available, the image superposing unit 205 may generate a superposed image such that the superposed image is superposed on the current position on the map scaled to the map. This configuration makes it possible to provide the driver with the information on his or her surroundings more appropriately.

In this manner, the image presentation device 100 according to the second example embodiment determines the possibility that the vehicle may collide with an object based on the relative speed of the object by using the tracking result of the object and presents the driver with the result of the determination. With this configuration, even if an object with a possibility of a collision is a moving object, it is possible to present the driver with the information regarding objects in the surroundings of the vehicle appropriately. Therefore, even if an object is a moving object, the possibility of preventing a collision with an object that could collide with the vehicle before the vehicle comes to a stop can be increased.

The image presentation device 100 according to the second example embodiment predicts the position where each object to be tracked will be located after the pre-stop elapsed time has passed based on the pre-stop elapsed time and the relative position and the relative speed of the object to be tracked. The image presentation device 100 according to the second example embodiment calculates the collision possibility index indicating the possibility that each object to be tracked may collide with the vehicle based on the predicted position and the pre-stop moving range. The image presentation device 100 according to the second example embodiment superposes the pre-stop moving range and the position of a detected object on each other on a screen. Then, the image presentation device 100 according to the second example embodiment generates an image that displays the position of a given object more saliently as the collision possibility index calculated for that object is higher. Thus, the driver can appropriately grasp an object to be tracked that has a high possibility of colliding with the vehicle.

Third Example Embodiment

Next, a third example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 16:
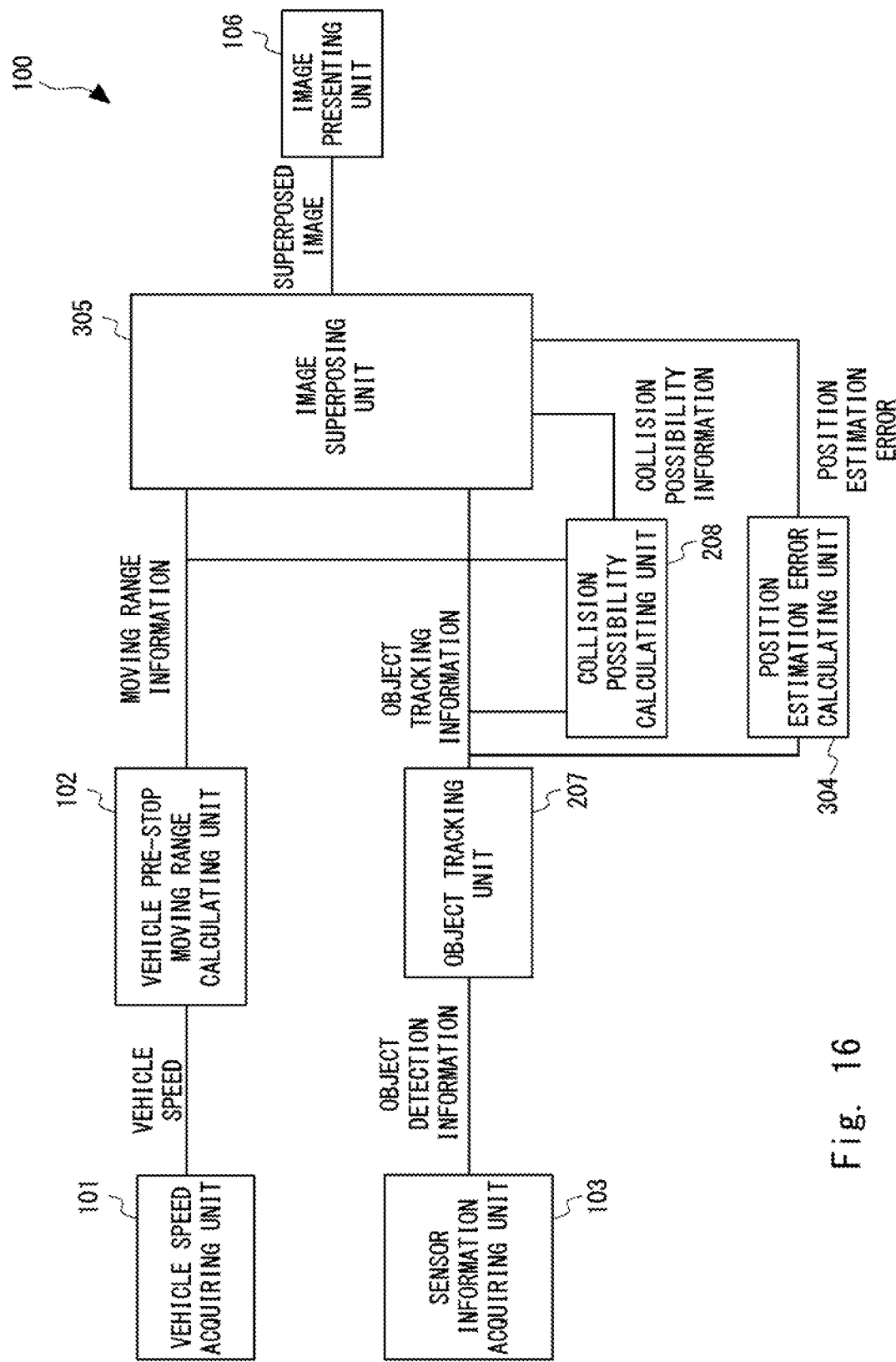
FIG. 16 illustrates a configuration of an image presentation device according to a third example embodiment.

FIG. 16 illustrates a configuration of an image presentation device 100 according to the third example embodiment. The image presentation device 100 according to the third example embodiment includes a vehicle speed acquiring unit 101, a vehicle pre-stop moving range calculating unit 102, a sensor information acquiring unit 103, an object tracking unit 207, a collision possibility calculating unit 208, a position estimation error calculating unit 304, an image superposing unit 305, and an image presenting unit 106. As compared to the image presentation device 100 according to the second example embodiment illustrated in FIG. 11, the image presentation device 100 according to the third example embodiment additionally includes the position estimation error calculating unit 304 and includes the image superposing unit 305 in place of the image superposing unit 205. The position estimation error calculating unit 304 and the image superposing unit 305 function as, respectively, a position estimation error calculating means and an image superposing means. How the units, other than the position estimation error calculating unit 304 and the image superposing unit 305, are connected to each other is substantially the same as in the configuration illustrated in FIG. 11.

Figure 17:
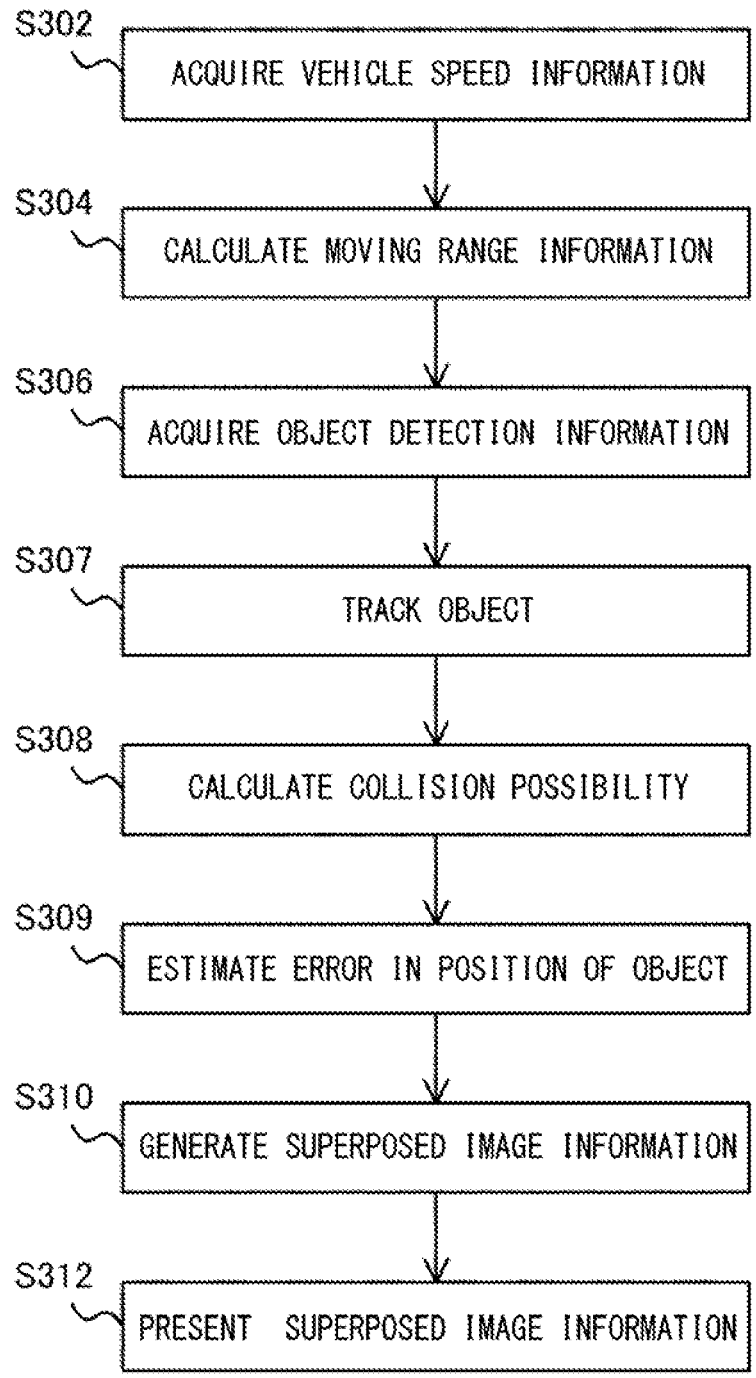
FIG. 17 is a flowchart illustrating an image presentation method executed by the image presentation device according to the third example embodiment.

FIG. 17 is a flowchart illustrating an image presentation method executed by the image presentation device 100 according to the third example embodiment. The vehicle speed acquiring unit 101 acquires vehicle speed information indicating the speed of the vehicle and outputs the acquired vehicle speed information to the vehicle pre-stop moving range calculating unit 102 (step S302). The vehicle pre-stop moving range calculating unit 102 calculates moving range information (a pre-stop moving range) based on the vehicle speed information and outputs the calculated moving range information to the image superposing unit 305 and the collision possibility calculating unit 208 (step S304). The sensor information acquiring unit 103 detects an object by use of a sensor to acquire object detection information and outputs the acquired object detection information to the object tracking unit 207 (step S306). The object tracking unit 207 generates object tracking information by tracking the object based on the object detection information and outputs the generated object tracking information to the image superposing unit 305, the collision possibility calculating unit 208, and the position estimation error calculating unit 304 (step S307). The collision possibility calculating unit 208 calculates the possibility of a collision with each tracked object based on the moving range information and the object tracking information and outputs collision possibility information indicating the possibility of a collision to the image superposing unit 305 (step S308).

The position estimation error calculating unit 304 estimates an error in the position of an object (calculates a position estimation error) based on the object tracking information output from the object tracking unit 207 and outputs position estimation error information to the image superposing unit 305 (step S309). The image superposing unit 305 generates a superposed image based on the moving range information, the object tracking information, the collision possibility information, and the position estimation error information and outputs superposed image information indicating the superposed image to the image presenting unit 106 (step S310). The image presenting unit 106 presents (displays) the superposed image information output from the image superposing unit 305 (step S312).

Next, an operation of the image presentation device 100 illustrated in FIG. 16 will be described. It is to be noted that operations of the constituent elements other than the position estimation error calculating unit 304 and the image superposing unit 305 are substantially the same as those of the counterparts in the image presentation device 100 according to the second example embodiment illustrated in FIG. 11.

Basically, the operation of the position estimation error calculating unit 304 is substantially the same as the operation of the position estimation error calculating unit 104 illustrated in FIG. 2. However, the estimation error of the position is an estimation error of the position obtained by tracking an object. For example, if an object is tracked by a Kalman filter, the position estimation error calculating unit 304 may calculate object tracking information including information of a covariance matrix of a state variable representing the position and calculate estimation error information based on the value of the information indicating this position.

Basically, the operation of the image superposing unit 305 is substantially the same as the operation of the image superposing unit 205 illustrated in FIG. 11. However, as with the image superposing unit 105 illustrated in FIG. 2, the image superposing unit 305 superposes the estimation error information of the position as well. Some examples of such a superposed image according to the third example embodiment will be described below.

Figure 18:
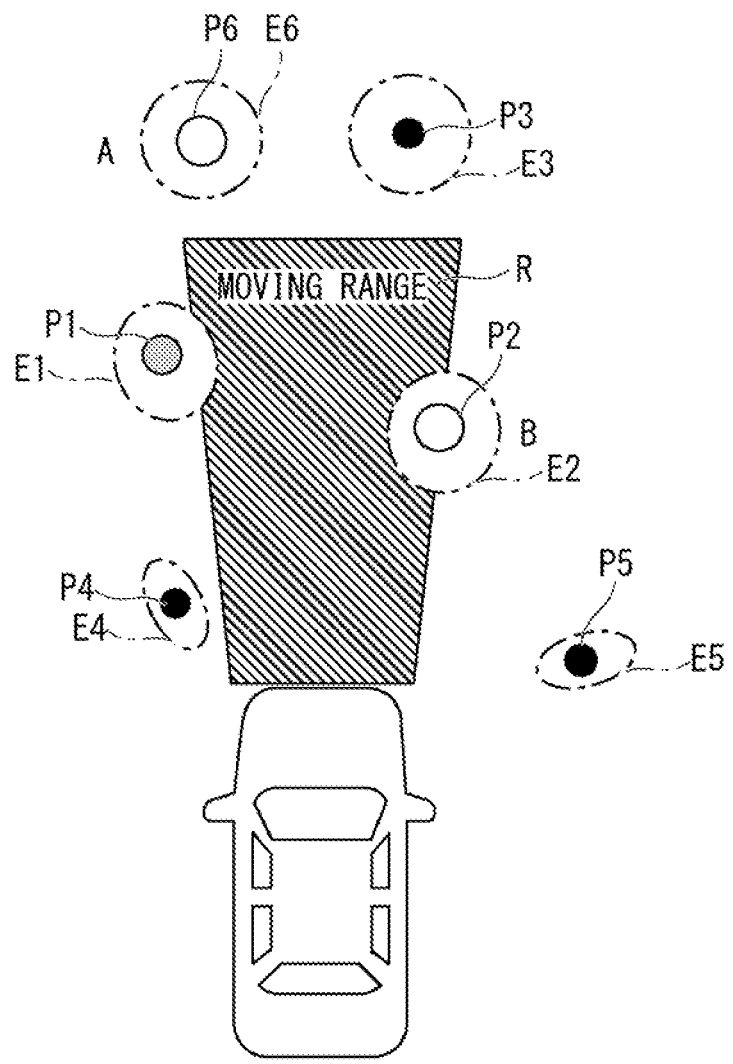
FIG. 18 illustrates an example of a superposed image according to the third example embodiment.
Figure 19:
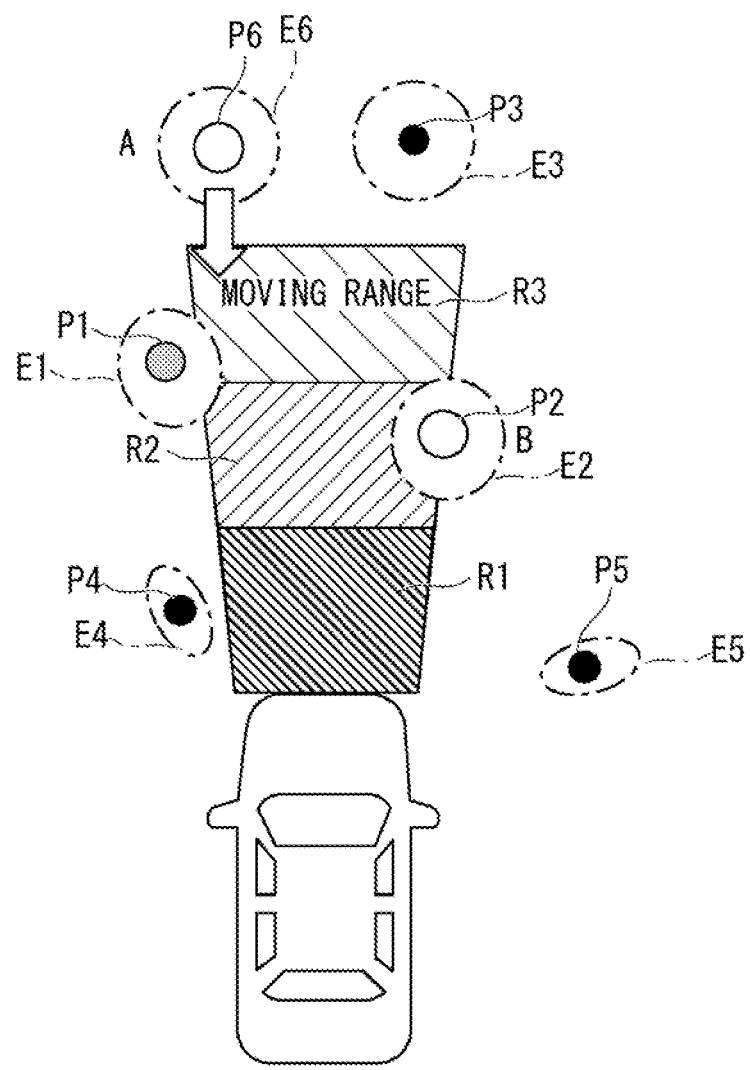
FIG. 19 illustrates another example of a superposed image according to the third example embodiment.
Figure 20:
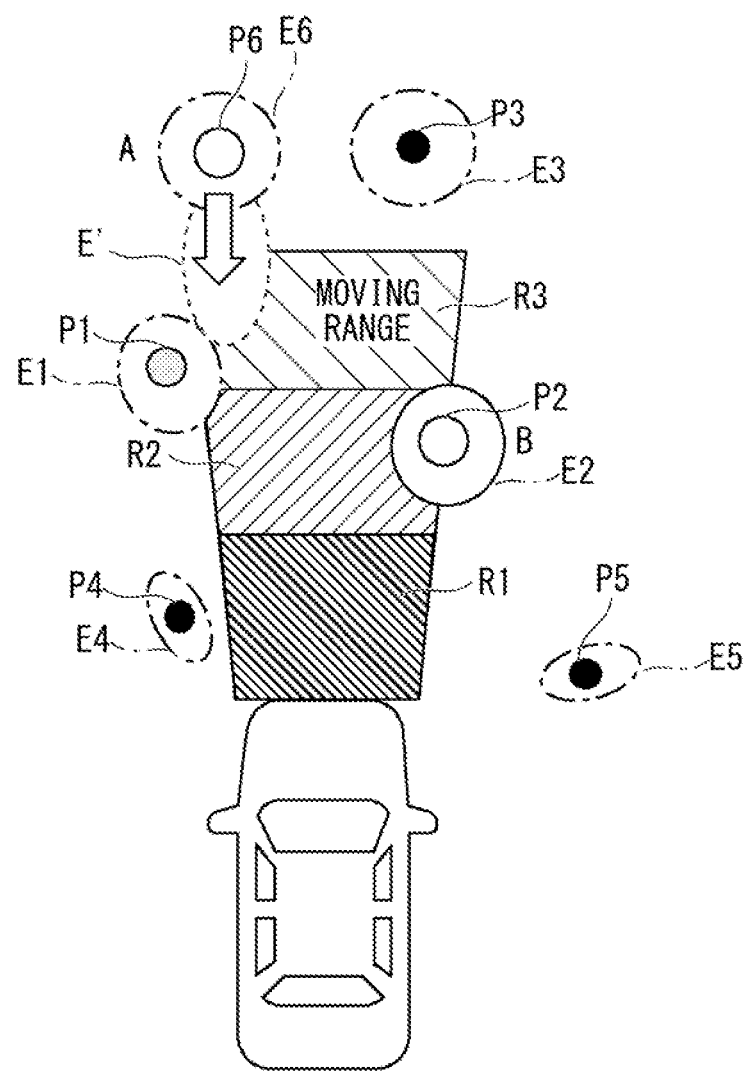
FIG. 20 illustrates another example of a superposed image according to the third example embodiment.

FIGS. 18 to 20 each illustrate an example of a superposed image according to the third example embodiment. The superposed images illustrated in FIGS. 18 to 20 are the superposed images illustrated in FIGS. 13 to 15, respectively, with the estimation error of the position further superposed thereon. In other words, in the examples illustrated in FIGS. 18 to 20, ellipses E1 to E6 indicating the estimation errors of the positions P1 to P6 of the respective objects are superposed so as to surround the respective positions P1 to P6 of the objects.

In this manner, presenting the estimation error information of the positions as well makes it possible to present the possibility of a collision more accurately than the superposed images illustrated in FIGS. 13 to 15 do. In particular, with regard to the position P1, the object corresponding to the position P1 in the examples illustrated in FIGS. 13 to 15 is determined to have no (or a low) possibility of colliding with the vehicle. Therefore, the position P1 is not displayed saliently in the examples illustrated in FIGS. 13 to 15. In contrast, in the examples illustrated in FIGS. 18 to 20, the ellipse E1 indicating the estimation error of the position P1 overlaps the moving range R, and therefore the object corresponding to the position P1 is displayed saliently as an object with a possibility of colliding with the vehicle. Therefore, the driver can recognize the possibility of a collision with not only the objects corresponding to the positions P6 and P2 but also the object corresponding to the position P1. Thus, as compared to the case according to the second example embodiment, the driver can be presented with information regarding objects in the surroundings of the vehicle more appropriately. Accordingly, the possibility of preventing a collision with an object that could collide with the vehicle before the vehicle comes to a stop can be further increased.

Fourth Example Embodiment

Next, a fourth example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 21:
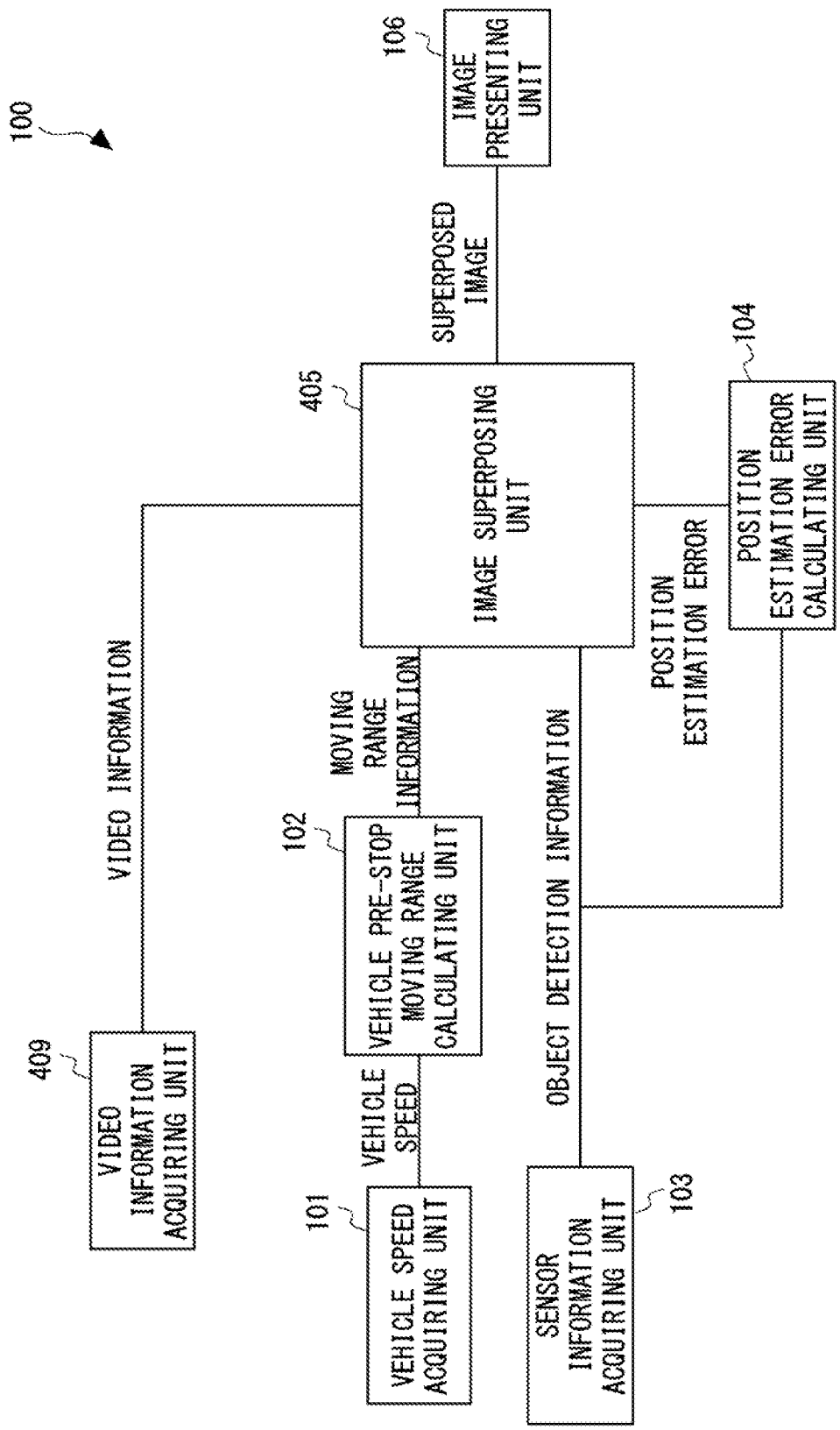
FIG. 21 illustrates a configuration of an image presentation device according to a fourth example embodiment.

FIG. 21 illustrates a configuration of an image presentation device 100 according to the fourth example embodiment. The image presentation device 100 according to the fourth example embodiment includes a vehicle speed acquiring unit 101, a vehicle pre-stop moving range calculating unit 102, a sensor information acquiring unit 103, a position estimation error calculating unit 104, a video information acquiring unit 409, an image superposing unit 405, and an image presenting unit 106. As compared to the image presentation device 100 according to the first example embodiment illustrated in FIG. 2, the image presentation device 100 according to the fourth example embodiment additionally includes the video information acquiring unit 409 and includes the image superposing unit 405 in place of the image superposing unit 105. The video information acquiring unit 409 and the image superposing unit 405 function as, respectively, a video information acquiring means and an image superposing means. How the units, other than the video information acquiring unit 409 and the image superposing unit 405, are connected to each other is substantially the same as in the configuration illustrated in FIG. 2.

Figure 22:
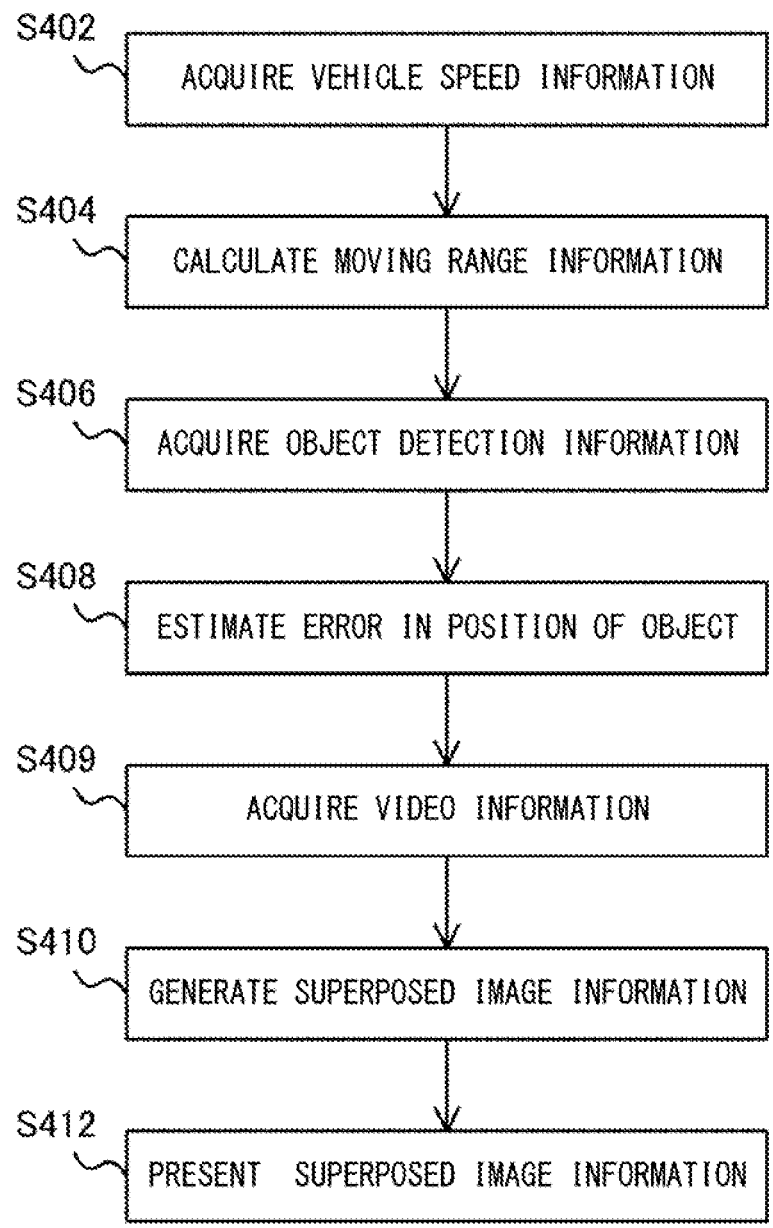
FIG. 22 is a flowchart illustrating an image presentation method executed by the image presentation device according to the fourth example embodiment.

FIG. 22 is a flowchart illustrating an image presentation method executed by the image presentation device 100 according to the fourth example embodiment. The vehicle speed acquiring unit 101 acquires vehicle speed information indicating the speed of the vehicle and outputs the acquired vehicle speed information to the vehicle pre-stop moving range calculating unit 102 (step S402). The vehicle pre-stop moving range calculating unit 102 calculates moving range information based on the vehicle speed information and outputs the calculated moving range information to the image superposing unit 405 (step S404). The moving range information indicates a range within which the vehicle may move before coming to a stop upon the driver stepping on the brake at the vehicle speed indicated by the vehicle speed information. The sensor information acquiring unit 103 detects an object by use of a sensor to acquire object detection information and outputs the object detection information to the image superposing unit 405 and the position estimation error calculating unit 104 (step S406). The position estimation error calculating unit 104 estimates an error in the position of the detected object (calculates a position estimation error) and outputs position estimation error information indicating the estimated error to the image superposing unit 405 (step S408).

The video information acquiring unit 409 acquires video information indicating a captured video and outputs the acquired video information to the image superposing unit 405 (step S409). The image superposing unit 405 generates a superposed image based on the moving range information, the object detection information, the position estimation error information, and the video information and outputs the generated superposed image to the image presenting unit 106 (step S410). The image presenting unit 106 presents (displays) the superposed image information output from the image superposing unit 405 (step S412).

Next, an operation of the image presentation device 100 according to the fourth example embodiment illustrated in FIG. 21 will be described. It is to be noted that operations of the constituent elements other than the video information acquiring unit 409 and the image superposing unit 405 are substantially the same as those of the counterparts in the image presentation device 100 according to the first example embodiment illustrated in FIG. 2.

The video information acquiring unit 409 is a means that captures a video of the surroundings of the host vehicle and may be constituted basically by a camera (an imaging device) provided in the host vehicle. Alternatively, the video information acquiring unit 409 may acquire, from a camera external to the image presentation device 100, video information indicating a video captured by this camera. Any camera that can capture a video may be used. However, if an object is detected and recognized through a video analysis as in an example embodiment described later, the camera needs to be able to capture a video at a resolution, an image quality, and a frame rate that allow for a process of detecting and recognizing an object. If that is not the case, any camera that can ensure the resolution and the image quality that allow an object to be confirmed visually may be used. A captured video (a time-series frame image) is output to the image superposing unit 405.

The operation of the image superposing unit 405 is basically the same as the operation of the image superposing unit 105 according to the first example embodiment illustrated in FIG. 2. However, the image superposing unit 405 superposes a video (a frame image) obtained by the video information acquiring unit 409 as well. The image superposing unit 405 may also superpose information regarding the field of view of the camera (the range captured by the camera).

Figure 23:
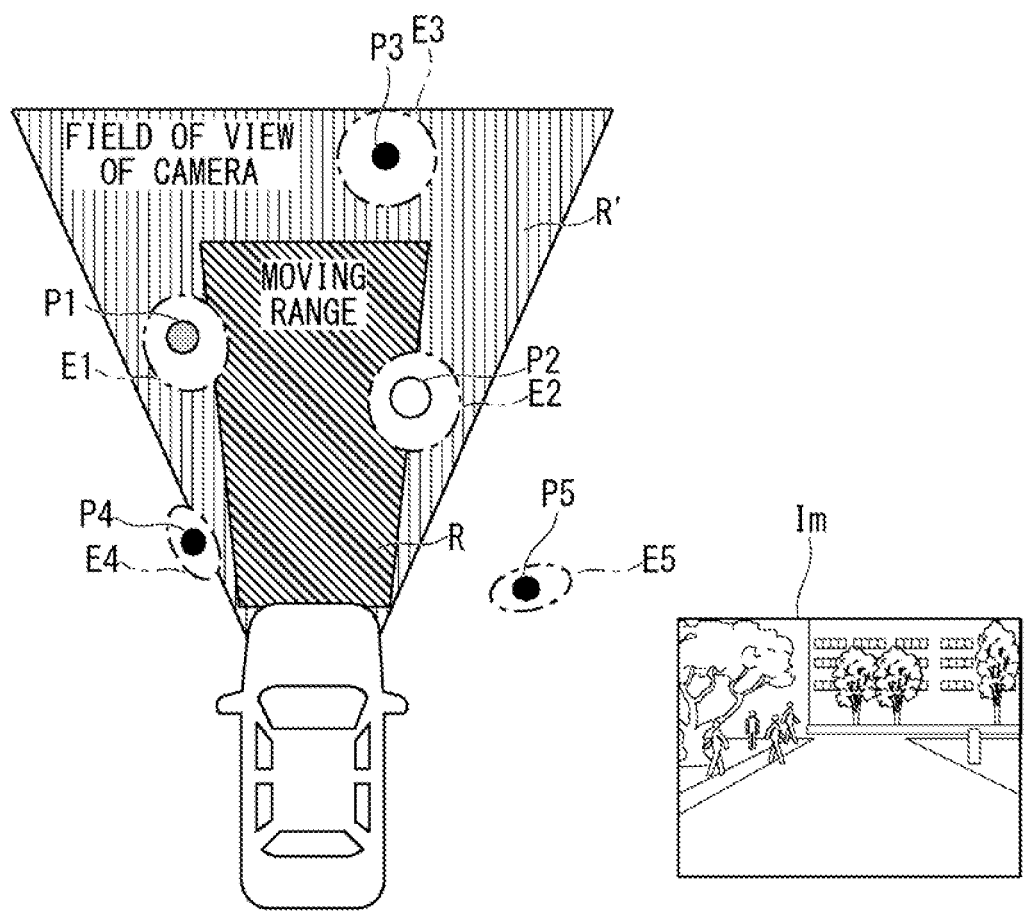
FIG. 23 illustrates an example of a superposed image according to the fourth example embodiment.

FIG. 23 illustrates an example of a superposed image according to the fourth example embodiment. FIG. 23 illustrates a superposed image in which a video Im from a camera that captures an image of the space ahead of the host vehicle is superposed and the field of view of the camera is also superposed. In FIG. 23, a region R' indicated by vertical hatching corresponds to the field of view of the camera.

The image superposing unit 405 may generate a superposed image such that, when a video is presented, the video alone is not simply presented but a section of the video where the object has been detected is presented in an enlarged manner. Which position on the video (the image) the position where the object has been detected corresponds to can be calculated based on camera parameters that can be calculated in advance through calibration. Therefore, the image superposing unit 405 calculates an image region in which a detected object is captured within the image and generates a superposed image such that that region is presented in an enlarged manner. This configuration allows the driver to visually recognize what the detected object is with ease.

In this manner, presenting the video as well allows the driver to grasp which position is captured. Moreover, the driver can confirm (visually recognize) the object being detected through the video. Therefore, the driver can take a more appropriate action for avoiding a collision. In addition, presenting the video as well allows the driver to grasp what the detected object is. Accordingly, as compared to the case according to the first example embodiment illustrated in FIG. 2, the driver can grasp the situation surrounding the vehicle more easily.

Fifth Example Embodiment

Next, a fifth example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 24:
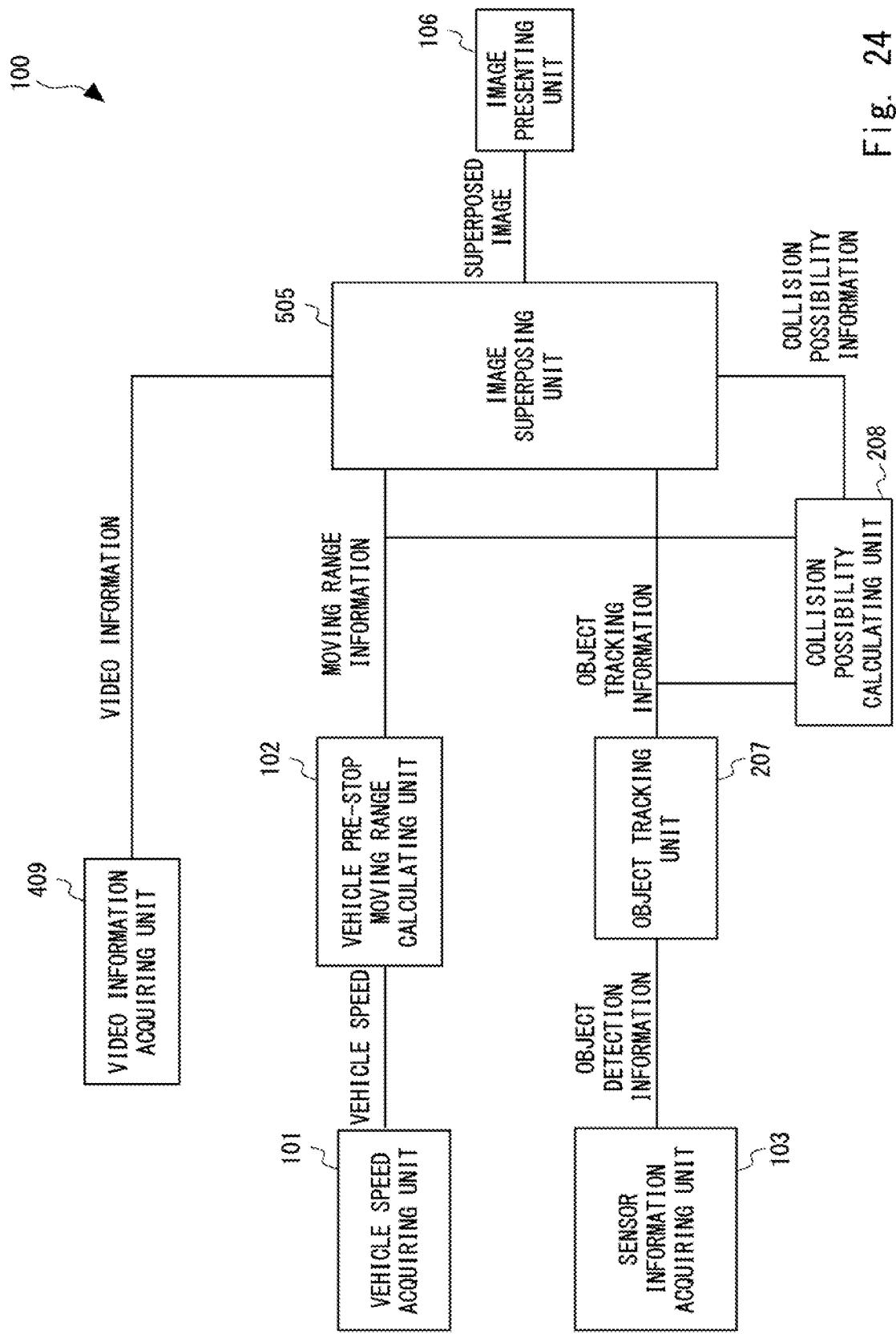
FIG. 24 illustrates a configuration of an image presentation device according to a fifth example embodiment.

FIG. 24 illustrates a configuration of an image presentation device 100 according to the fifth example embodiment. The image presentation device 100 according to the fifth example embodiment includes a vehicle speed acquiring unit 101, a vehicle pre-stop moving range calculating unit 102, a sensor information acquiring unit 103, an object tracking unit 207, a collision possibility calculating unit 208, a video information acquiring unit 409, an image superposing unit 505, and an image presenting unit 106. As compared to the image presentation device 100 according to the second example embodiment illustrated in FIG. 11, the image presentation device 100 according to the fifth example embodiment additionally includes the video information acquiring unit 409 and includes the image superposing unit 505 in place of the image superposing unit 205. The video information acquiring unit 409 and the image superposing unit 505 function as, respectively, a video information acquiring means and an image superposing means. How the units, other than the video information acquiring unit 409 and the image superposing unit 505, are connected to each other is substantially the same as in the configuration illustrated in FIG. 11.

Figure 25:
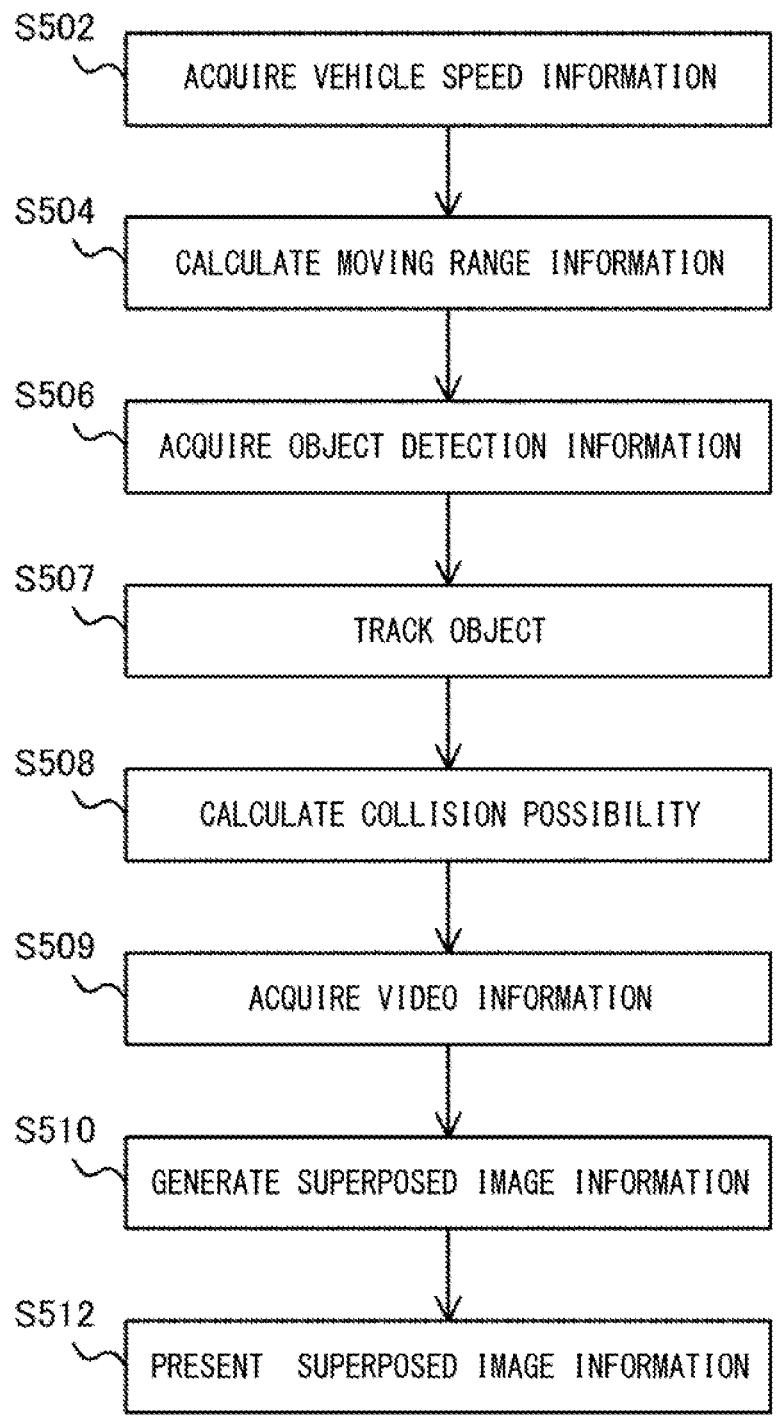
FIG. 25 is a flowchart illustrating an image presentation method executed by the image presentation device according to the fifth example embodiment.

FIG. 25 is a flowchart illustrating an image presentation method executed by the image presentation device 100 according to the fifth example embodiment. The processes at S502 to S508 are substantially the same as the processes at S202 to S208, respectively, illustrated in FIG. 12, and thus descriptions thereof will be omitted. The video information acquiring unit 409 acquires video information and outputs the acquired video information to the image superposing unit 505 (step S509). The image superposing unit 505 generates a superposed image based on the moving range information, the object tracking information, the collision possibility information, and the video information and outputs superposed image information to the image presenting unit 106 (step S510). The image presenting unit 106 presents (displays) the superposed image information output from the image superposing unit 505 (step S512).

Next, an operation of the image presentation device 100 according to the fifth example embodiment illustrated in FIG. 24 will be described. Operations of the constituent elements other than the video information acquiring unit 409 and the image superposing unit 505 are substantially the same as those of the counterparts in the image presentation device 100 according to the second example embodiment illustrated in FIG. 11. The operation of the video information acquiring unit 409 is the same as that of the video information acquiring unit 409 of the image presentation device 100 according to the fourth example embodiment illustrated in FIG. 21.

The operation of the image superposing unit 505 is basically the same as the operation of the image superposing unit 205 according to the second example embodiment illustrated in FIG. 11. However, the image superposing unit 505 superposes a video (a frame image) obtained by the video information acquiring unit 409 as well. The manners how the video is superposed and the information regarding the field of view of the camera are presented are the same as those associated with the image superposing unit 405 according to the fourth example embodiment illustrated in FIG. 21. The generated image is output to the image presenting unit 106 and presented to the driver.

In this manner, presenting the video as well allows the driver to grasp which position is captured. Moreover, the driver can confirm (visually recognize) the object being detected through the video. Therefore, the driver can take a more appropriate action for avoiding a collision. In addition, presenting the video as well allows the driver to grasp what the detected object is. Accordingly, as compared to the case according to the second example embodiment illustrated in FIG. 11, the driver can grasp the situation surrounding the vehicle more easily.

Sixth Example Embodiment

Next, a sixth example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 26:
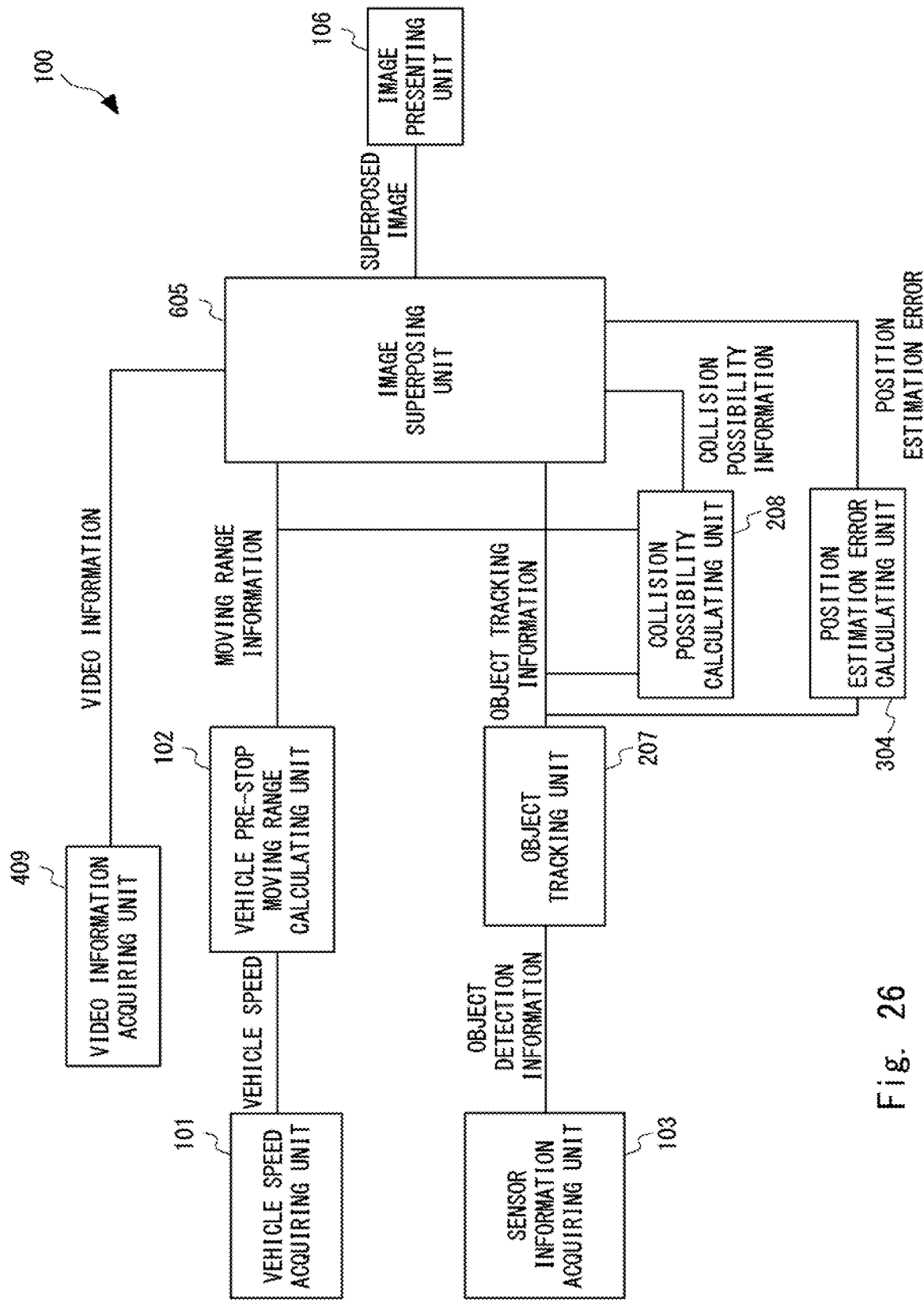
FIG. 26 illustrates a configuration of an image presentation device according to a sixth example embodiment.

FIG. 26 illustrates a configuration of an image presentation device 100 according to the sixth example embodiment. The image presentation device 100 according to the sixth example embodiment includes a vehicle speed acquiring unit 101, a vehicle pre-stop moving range calculating unit 102, a sensor information acquiring unit 103, an object tracking unit 207, a collision possibility calculating unit 208, and a position estimation error calculating unit 304. The image presentation device 100 according to the sixth example embodiment further includes a video information acquiring unit 409, an image superposing unit 605, and an image presenting unit 106. As compared to the image presentation device 100 according to the third example embodiment illustrated in FIG. 16, the image presentation device 100 according to the sixth example embodiment additionally includes the video information acquiring unit 409 and includes the image superposing unit 605 in place of the image superposing unit 305. The video information acquiring unit 409 and the image superposing unit 605 function as, respectively, a video information acquiring means and an image superposing means. How the units, other than the video information acquiring unit 409 and the image superposing unit 605, are connected to each other is substantially the same as in the configuration illustrated in FIG. 16.

Figure 27:
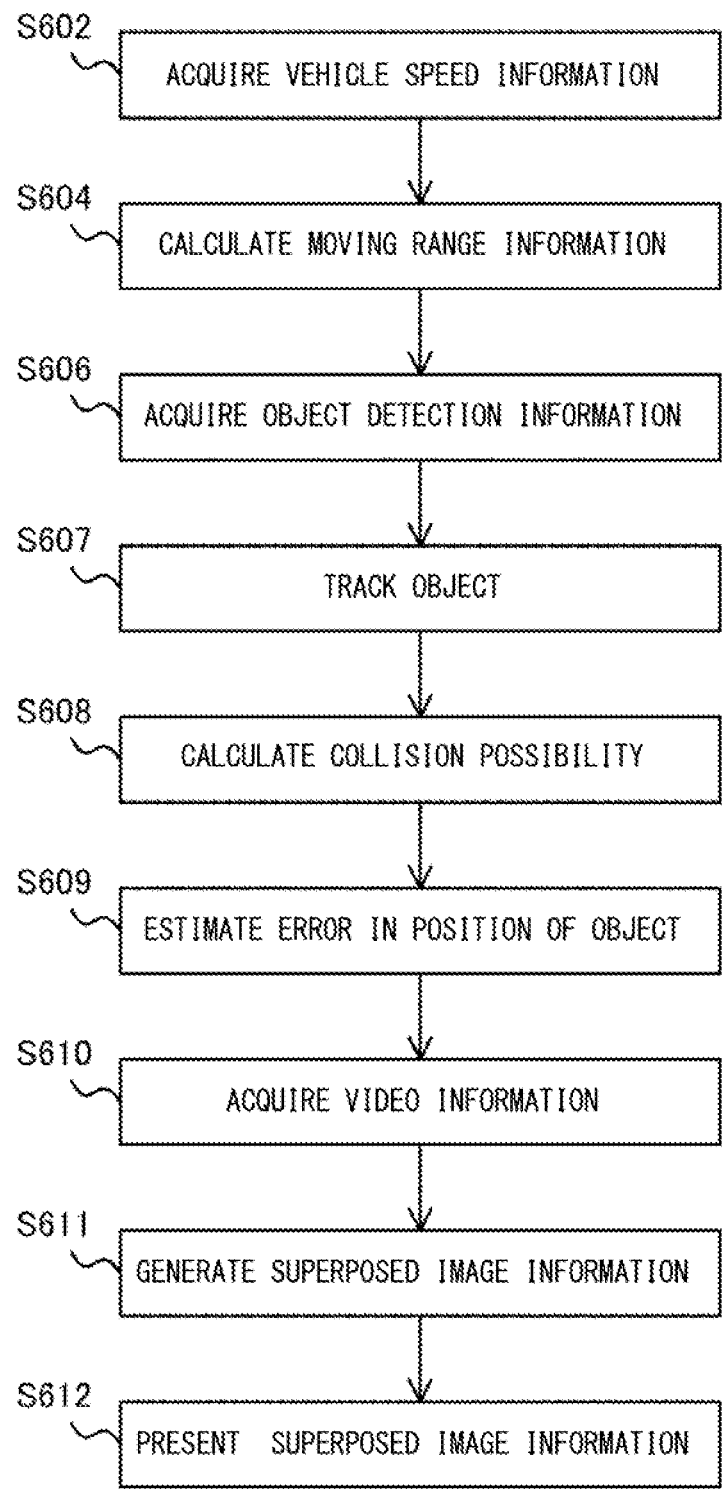
FIG. 27 is a flowchart illustrating an image presentation method executed by the image presentation device according to the sixth example embodiment.

FIG. 27 is a flowchart illustrating an image presentation method executed by the image presentation device 100 according to the sixth example embodiment. The processes at S602 to S609 are substantially the same as the processes at S302 to S309, respectively, illustrated in FIG. 17, and thus descriptions thereof will be omitted. The video information acquiring unit 409 acquires video information and outputs the acquired video information to the image superposing unit 605 (step S610). The image superposing unit 605 generates a superposed image based on the moving range information, the object tracking information, the collision possibility information, the position estimation error information, and the video information and outputs superposed image information to the image presenting unit 106 (step S611). The image presenting unit 106 presents (displays) the superposed image information output from the image superposing unit 505 (step S612).

Next, an operation of the image presentation device 100 according to the sixth example embodiment illustrated in FIG. 26 will be described. Operations of the constituent elements other than the video information acquiring unit 409 and the image superposing unit 605 are substantially the same as those of the counterparts in the image presentation device 100 according to the third example embodiment illustrated in FIG. 16. The operation of the video information acquiring unit 409 is the same as that of the video information acquiring unit 409 of the image presentation device 100 according to the fourth example embodiment illustrated in FIG. 21.

The operation of the image superposing unit 605 is basically the same as the operation of the image superposing unit 305 according to the third example embodiment illustrated in FIG. 16. However, the image superposing unit 605 superposes a video (a frame image) obtained by the video information acquiring unit 409 as well. The manners how the video is superposed and the information regarding the field of view of the camera are presented are the same as those associated with the image superposing unit 405 according to the fourth example embodiment illustrated in FIG. 21. The generated image is output to the image presenting unit 106 and presented to the driver.

In this manner, presenting the video as well allows the driver to grasp which position is captured. Moreover, the driver can confirm (visually recognize) the object being detected through the video. Therefore, the driver can take a more appropriate action for avoiding a collision. In addition, presenting the video as well allows the driver to grasp what the detected object is. Accordingly, as compared to the case according to the third example embodiment illustrated in FIG. 16, the driver can grasp the situation surrounding the vehicle more easily.

Seventh Example Embodiment

Next, a seventh example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 28:
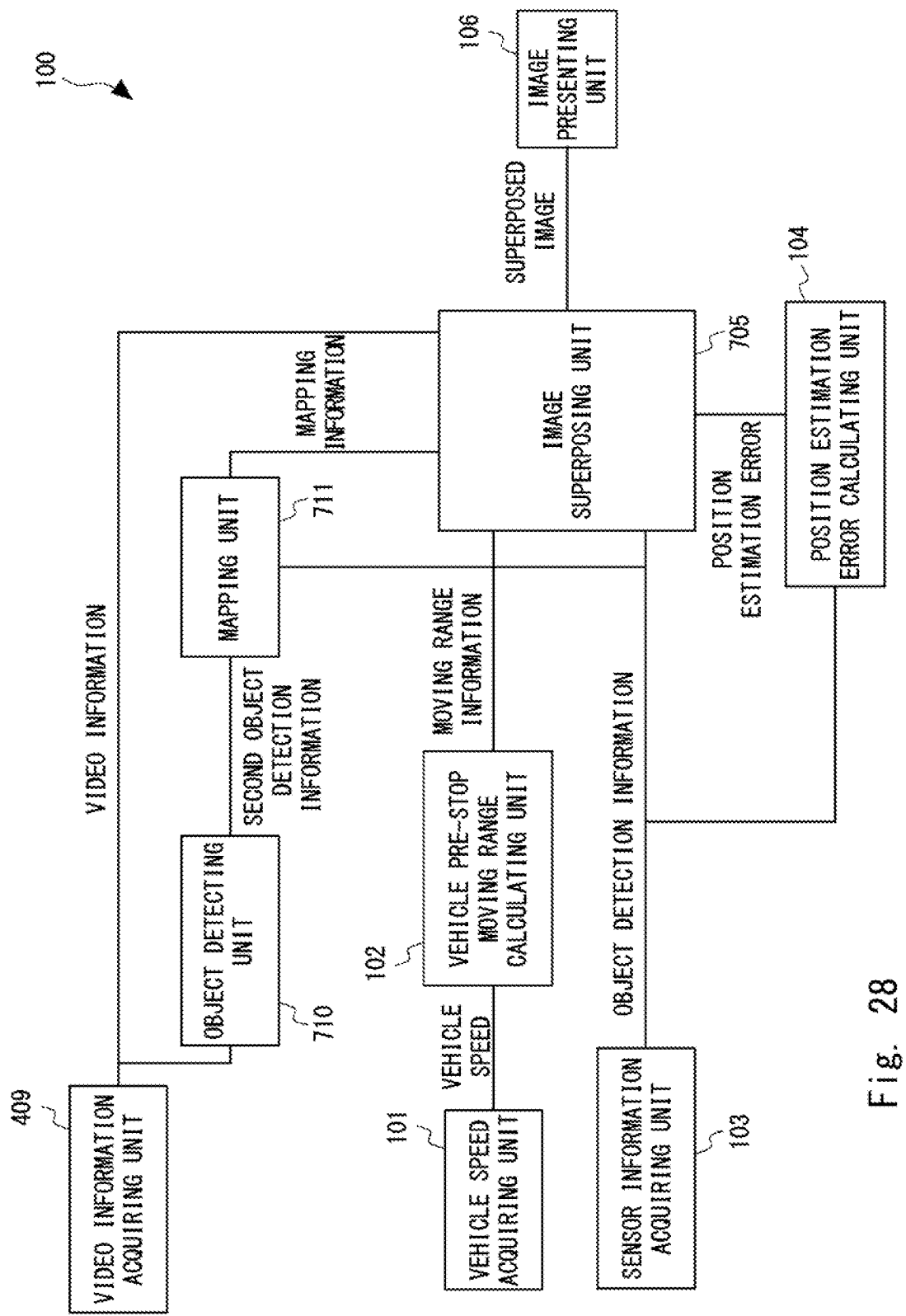
FIG. 28 illustrates a configuration of an image presentation device according to a seventh example embodiment.

FIG. 28 illustrates a configuration of an image presentation device 100 according to the seventh example embodiment. The image presentation device 100 according to the seventh example embodiment includes a vehicle speed acquiring unit 101, a vehicle pre-stop moving range calculating unit 102, a sensor information acquiring unit 103, and a position estimation error calculating unit 104. The image presentation device 100 according to the seventh example embodiment further includes a video information acquiring unit 409, an object detecting unit 710, a mapping unit 711, an image superposing unit 705, and an image presenting unit 106. As compared to the image presentation device 100 according to the fourth example embodiment illustrated in FIG. 21, the image presentation device 100 according to the seventh example embodiment additionally includes the object detecting unit 710 and the mapping unit 711 and includes the image superposing unit 705 in place of the image superposing unit 405. The object detecting unit 710, the mapping unit 711, and the image superposing unit 705 function as, respectively, an object detecting means, a mapping means, and an image superposing means. How the units, other than the object detecting unit 710, the mapping unit 711, and the image superposing unit 705, are connected to each other is substantially the same as in the configuration illustrated in FIG. 21.

Figure 29:
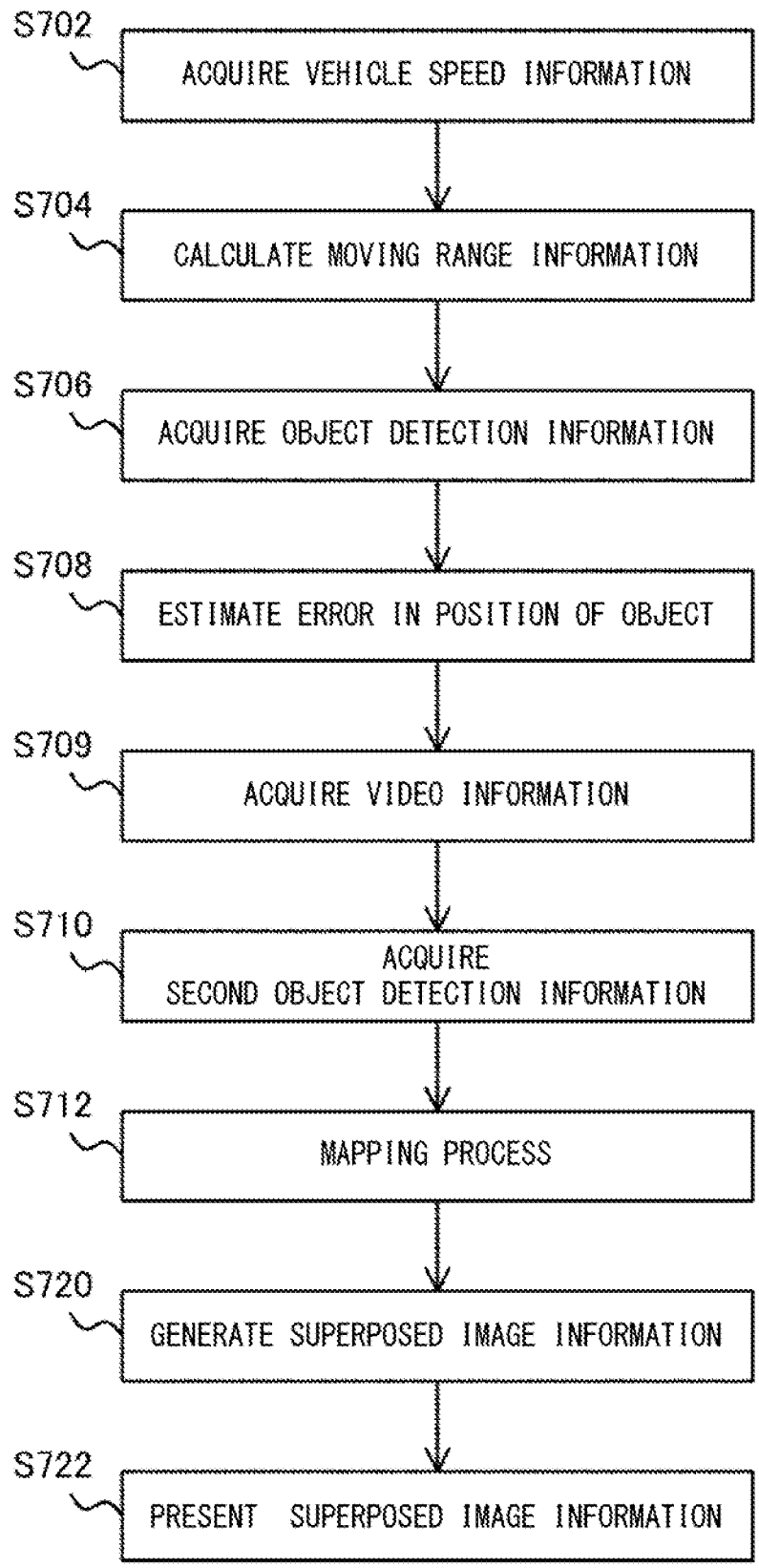
FIG. 29 is a flowchart illustrating an image presentation method executed by the image presentation device according to the seventh example embodiment.

FIG. 29 is a flowchart illustrating an image presentation method executed by the image presentation device 100 according to the seventh example embodiment. The processes at S702 to S709 are substantially the same as the processes at S402 to S409, respectively, illustrated in FIG. 22, and thus descriptions thereof will be omitted.

The object detecting unit 710 performs an object detection process on the video (the image) output from the video information acquiring unit 409 to acquire second object detection information and outputs the second object detection information to the mapping unit 711 (step S710). The mapping unit 711 performs a process of mapping (i.e., associating) the second object detection information output from the object detecting unit 710 to the object detection information output from the sensor information acquiring unit 103 and outputs mapping information to the image superposing unit 705 (step S712). The image superposing unit 705 generates a superposed image based on the moving range information, the object detection information, the position estimation error information, the video information, and the mapping information and outputs superposed image information to the image presenting unit 106 (step S720). The image presenting unit 106 presents (displays) the superposed image information output from the image superposing unit 705 (step S722).

Next, an operation of the image presentation device 100 according to the seventh example embodiment illustrated in FIG. 28 will be described. Operations of the constituent elements other than the object detecting unit 710, the mapping unit 711, and the image superposing unit 705 are substantially the same as those of the counterparts in the image presentation device 100 according to the fourth example embodiment illustrated in FIG. 21.

The object detecting unit 710 performs an object detection process on a video (a frame image) acquired by the video information acquiring unit 409 and outputs the result of the detection as second object detection information. In detecting an object from an image, the object detecting unit 710 can employ various schemes. For example, the object detecting unit 710 can extract a visual feature, such as a Histograms of Oriented Gradients (HOG) feature or a Scale Invariant Feature Transform (SIFT) feature, from an image and detect an object by use of a detector trained based on the extracted feature. Alternatively, a detector that detects an object directly from an image by use of a Convolutional Neural Network (CNN) may be used.

The object detecting unit 710 integrates the information regarding the detected object to generate the second object detection information. In this example, the second object detection information includes, for example, the position where the object has been detected, the size of the object, and the type (the class) of the object. For example, if the position of the detection (and the size of the object) is indicated by a position on the image, the position may be indicated by the coordinates of the apexes of a rectangle enclosing the object (e.g., the coordinates of the upper left and lower right apexes of the rectangle). Alternatively, the position of the detection (and the size of the object) may be indicated by information indicating one apex of a rectangle (e.g., the upper left apex) and the width and the height of the rectangle. If a plurality of objects have been detected, the second object detection information includes information on the detected plurality of objects. The second object detection information may further include ID information for identifying each detected object within the same image. The generated second object detection information is output to the mapping unit 711.

The mapping unit 711 maps (i.e., associates) the result of detecting objects included in the second object detection information to the result of detecting objects included in the object detection information (referred to below as first object detection information) output from the sensor information acquiring unit 103. In other words, the mapping unit 711 determines a detected object in the second object detection information and a detected object in the first object detection information that are estimated to be identical to each other. Then, the mapping unit 711 maps (i.e., associates) the object in the second object detection information to the object in the first object detection information that is determined to be identical to the object in the second object detection information.

There are various methods of mapping (i.e., associating) these objects. For example, the mapping unit 711 converts the position information of the detected object included in the second object detection information to the position coordinates on the host vehicle relative coordinate system by use of camera parameters calculated through calibration of the camera. Then, if the distance between the positions on this coordinate system is shorter than a preset threshold, the mapping unit 711 maps (i.e., associates) the detected object included in the second object detection information to the detected object included in the first object detection information.

Alternatively, the mapping unit 711 converts the position information of the first object detection information to the position coordinates on the image by use of camera parameters. Then, if the distance between the positions on the image is shorter than a preset threshold, the mapping unit 711 may map (i.e., associate) the position information of the first object detection information to the detected object included in the second object detection information.

For the objects mapped as described above, the mapping unit 711 appends, to the second object detection information, ID information of the object included in the mapped first object detection information and thus generates mapping information. In other words, the mapping information is information indicating the result of the mapping. In this case, the mapping unit 711 may append information indication that no mapping is available to an object that has failed to be mapped. For example, if the ID of an object is defined by a nonnegative integer, the mapping unit 711 may set the ID of the object that has failed to be mapped to a negative value to indicate that no mapping is available. The generated mapping information is output to the image superposing unit 705.

The operation of the image superposing unit 705 is basically the same as the operation of the image superposing unit 405 according to the fourth example embodiment illustrated in FIG. 21. However, the image superposing unit 705 may generate a superposed image in which an object related to the object detection information included in the mapping information is superposed on the video information (the camera image) to present the object. For example, the image superposing unit 705 may generate a superposed image in which the rectangle and the type of the detected object are superposed on the camera image to present the object.

When the information indicating the object included in the first object detection information is superposed, if this object is mapped to any of the detected objects in the second object detection information through the mapping information, the image superposing unit 705 may change the mode of superposition in accordance with the type of the mapped object. For example, the image superposing unit 705 may change the mark to be superposed in accordance with the type of the object. Further, the image superposing unit 705 may change the mode of superposition in consideration of a difference in the influence that colliding with that object has, in accordance with the type of the object. For example, the image superposing unit 705 may preferentially present an object whose degree of influence of a collision is greater than a preset threshold. Alternatively, the image superposing unit 705 may change the degree of salience in accordance with the degree of influence that colliding with a given object has. For example, the image superposing unit 705 may raise the degree of salience as the degree of influence that colliding with a given object has is greater. The expression "the mode of superposition" encompasses "the degree of salience."

The image superposing unit 705 may also make the display salient when superposing the detection result on a camera image. For example, the image superposing unit 705 may present a corresponding object with a thicker rectangle or in a noticeable color or may cause the rectangle to flash. Alternatively, the image superposing unit 705 may present the object itself in an enlarged manner along with the camera image. In other words, the image superposing unit 705 may calculate an image region corresponding to the position where the object to be displayed saliently is present in the video and superpose the calculated image region in an enlarged manner. In particular, if the object is small, displaying the object in an enlarged manner improves its visibility.

In this manner, the image presentation device 100 according to the seventh example embodiment generates the second object detection information by performing an object detection process on a video. Moreover, the image presentation device 100 according to the seventh example embodiment maps (i.e., associates) an object included in the object detection information to an object included in the second object detection information to generate mapping information indicating the result of the mapping. Moreover, the image presentation device 100 according to the seventh example embodiment generates a superposed image in which the object related to the object detection information indicated by the mapping information is superposed on the video to present the object. In other words, according to the seventh example embodiment, a video is presented as well, the result of recognizing an object is superposed and displayed, and the method of superposition is controlled based on this result. This configuration enables the driver to recognize the detected object more reliably through the video. Therefore, the driver can take a more appropriate action for avoiding a collision. In addition, presenting the video as well allows the driver to grasp what the detected object is. Therefore, as compared to the case according to the fourth example embodiment illustrated in FIG. 21, the driver can grasp the situation surrounding the vehicle more easily.

Moreover, the image presentation device 100 according to the seventh example embodiment is configured to change the mode of superposition in accordance with the type of the mapped object. This configuration enables the driver to grasp more reliably the degree of influence to be experienced when each object collides with the vehicle. Therefore, the driver can take a more appropriate action for avoiding a collision.

Eighth Example Embodiment

Next, an eighth example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 30:
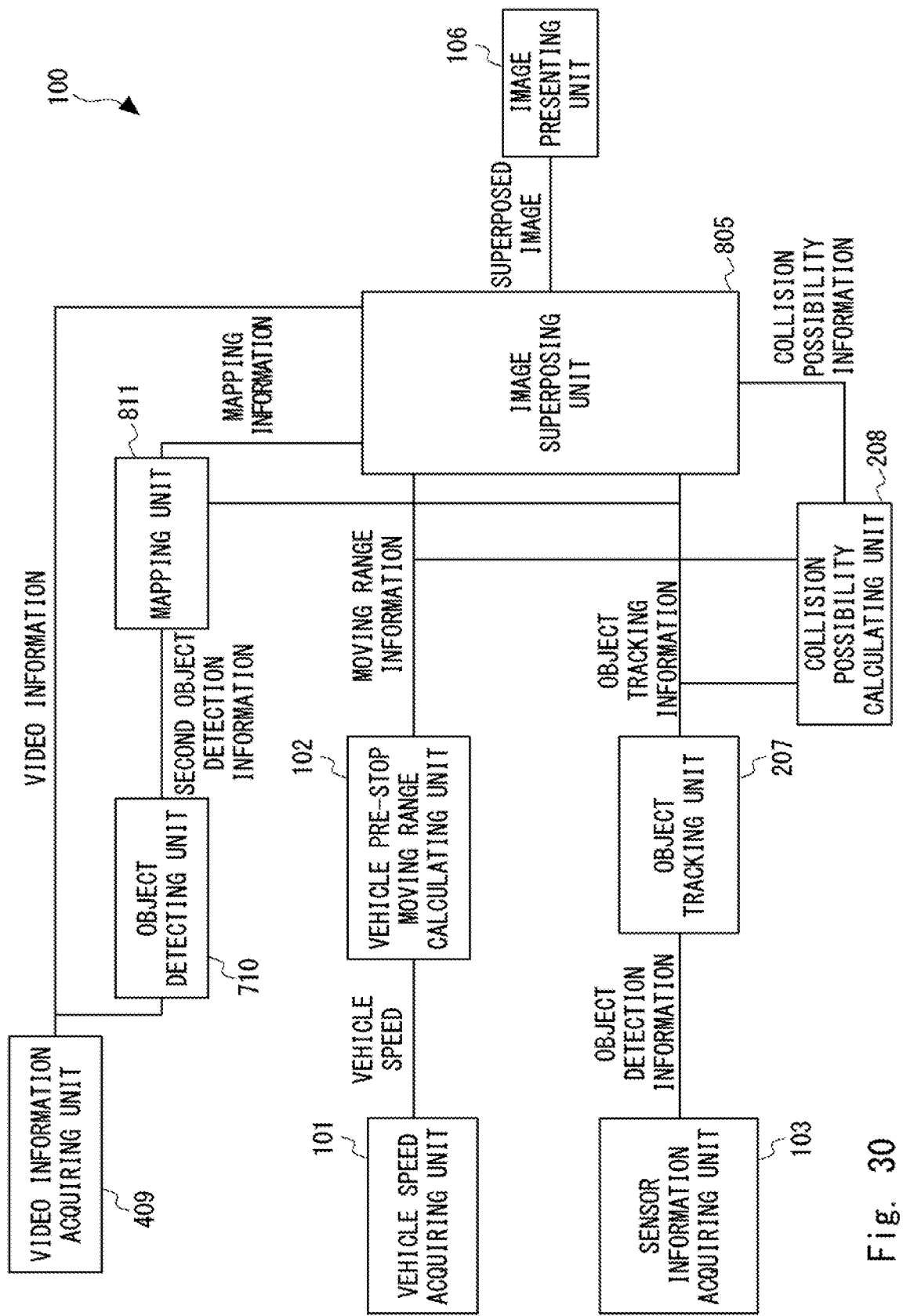
FIG. 30 illustrates a configuration of an image presentation device according to an eighth example embodiment.

FIG. 30 illustrates a configuration of an image presentation device 100 according to the eight example embodiment. The image presentation device 100 according to the eighth example embodiment includes a vehicle speed acquiring unit 101, a vehicle pre-stop moving range calculating unit 102, a sensor information acquiring unit 103, an object tracking unit 207, and a collision possibility calculating unit 208. The image presentation device 100 according to the eighth example embodiment further includes a video information acquiring unit 409, an object detecting unit 710, a mapping unit 811, an image superposing unit 805, and an image presenting unit 106. As compared to the image presentation device 100 according to the fifth example embodiment illustrated in FIG. 24, the image presentation device 100 according to the eighth example embodiment additionally includes the object detecting unit 710 and the mapping unit 811 and includes the image superposing unit 805 in place of the image superposing unit 505. The object detecting unit 710, the mapping unit 811, and the image superposing unit 805 function as, respectively, an object detecting means, a mapping means, and an image superposing means. How the units, other than the object detecting unit 710, the mapping unit 811, and the image superposing unit 705, are connected to each other is substantially the same as in the configuration illustrated in FIG. 24.

Figure 31:
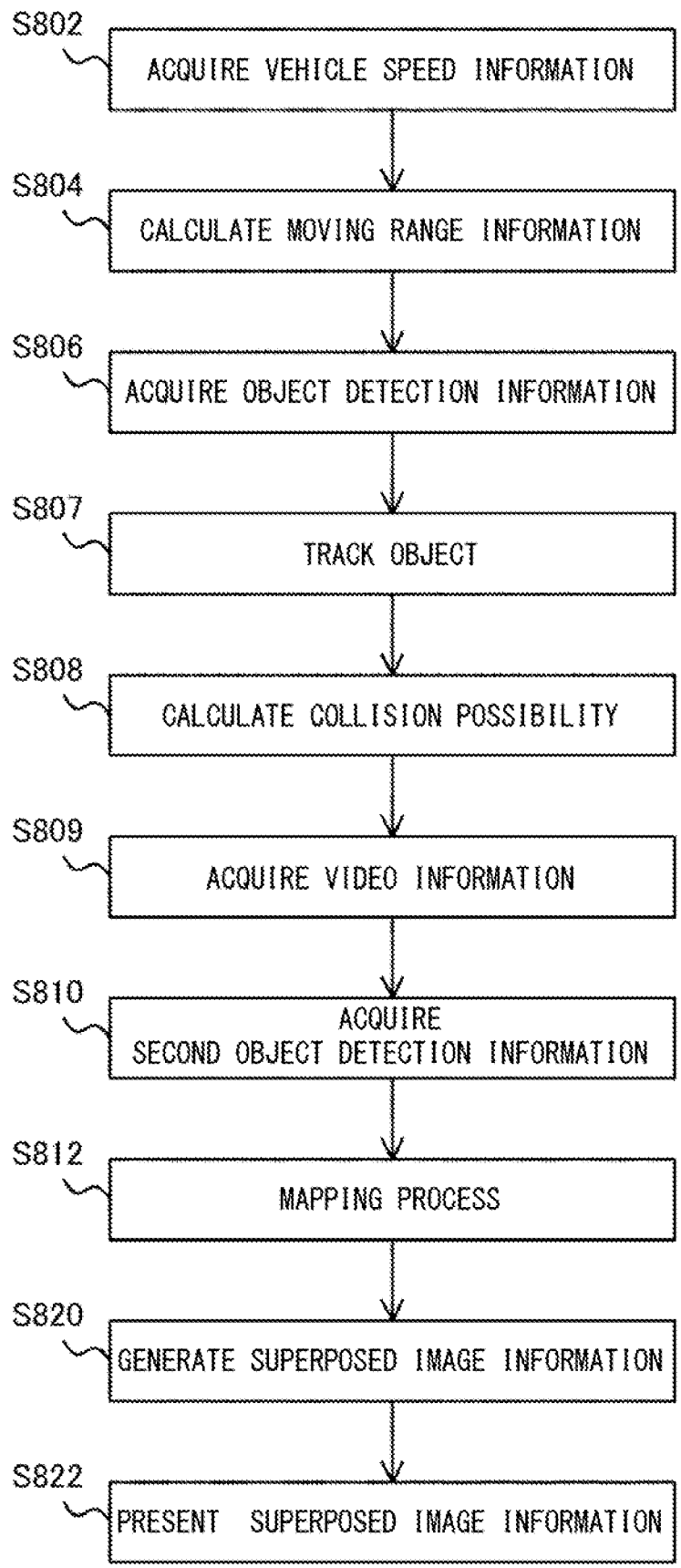
FIG. 31 is a flowchart illustrating an image presentation method executed by the image presentation device according to the eighth example embodiment.

FIG. 31 is a flowchart illustrating an image presentation method executed by the image presentation device 100 according to the eighth example embodiment. The processes at S802 to S809 are substantially the same as the processes at S502 to S509, respectively, illustrated in FIG. 25, and thus descriptions thereof will be omitted.

The object detecting unit 710 performs an object detection process on the video (the image) output from the video information acquiring unit 409 to acquire second object detection information and outputs the second object detection information to the mapping unit 811 (step S810). The mapping unit 811 performs a process of mapping (i.e., associating) the second object detection information output from the object detecting unit 710 to the object tracking information output from the object tracking unit 207 and outputs mapping information to the image superposing unit 805 (step S812). The image superposing unit 805 generates a superposed image based on the moving range information, the object tracking information, the collision possibility information, the video information, and the mapping information and outputs superposed image information to the image presenting unit 106 (step S820). The image presenting unit 106 presents (displays) the superposed image information output from the image superposing unit 805 (step S822).

Next, an operation of the image presentation device 100 according to the eighth example embodiment illustrated in FIG. 30 will be described. Operations of the constituent elements other than the object detecting unit 710, the mapping unit 811, and the image superposing unit 805 are substantially the same as those of the counterparts in the image presentation device 100 according to the fifth example embodiment illustrated in FIG. 24. The operation of the object detecting unit 710 is substantially the same as the operation of the object detecting unit 710 according to the seventh example embodiment illustrated in FIG. 28.

The operation of the mapping unit 811 is basically same as the operation of the mapping unit 711 according to the seventh example embodiment illustrated in FIG. 28. However, the mapping unit 811 performs mapping not on the result of the detection by a sensor but by use of the object tracking information obtained by the object tracking unit 207. The technique of mapping is the same as the technique employed by the mapping unit 711 illustrated in FIG. 28. In other words, the mapping unit 811 maps, based on the distance between the position of the detected object included in the second object detection information and the position of the object to be tracked included in the object tracking information, the two objects to each other. For the objects mapped, the mapping unit 811 appends, to the second object detection information, ID information of the object included in the mapped object tracking information and thus generates mapping information. The generated mapping information is output to the image superposing unit 805.

The operation of the image superposing unit 805 is basically the same as the operation of the image superposing unit 505 according to the fifth example embodiment illustrated in FIG. 24. However, the image superposing unit 805 presents the result of detecting an object from a video and also generates a superposed image with the method of superposing information varied based on the mapping information. The method of presenting the result of detecting an object from a video and the method of varying how the information is superposed based on the mapping information are the same as the methods employed by the image superposing unit 705 according to the seventh example embodiment illustrated in FIG. 28. The generated image is output to the image presenting unit 106 and presented to the driver.

In this manner, according to the eighth example embodiment, a video is presented as well, the result of recognizing an object is superposed and displayed, and the method of superposition is controlled based on this result. This configuration enables the driver to recognize a detected object more reliably through a video. Therefore, the driver can take a more appropriate action for avoiding a collision. In addition, presenting the video as well allows the driver to grasp what the detected object is. Accordingly, as compared to the case according to the fifth example embodiment illustrated in FIG. 24, the driver can grasp the situation surrounding the vehicle more easily.

Ninth Example Embodiment

Next, a ninth example embodiment will be described with reference to the drawings. In the following descriptions and drawings, omissions and simplifications are made, as appropriate, to make the descriptions clearer. In the drawings, identical elements are given identical reference characters, and their repetitive descriptions will be omitted, as necessary.

Figure 32:
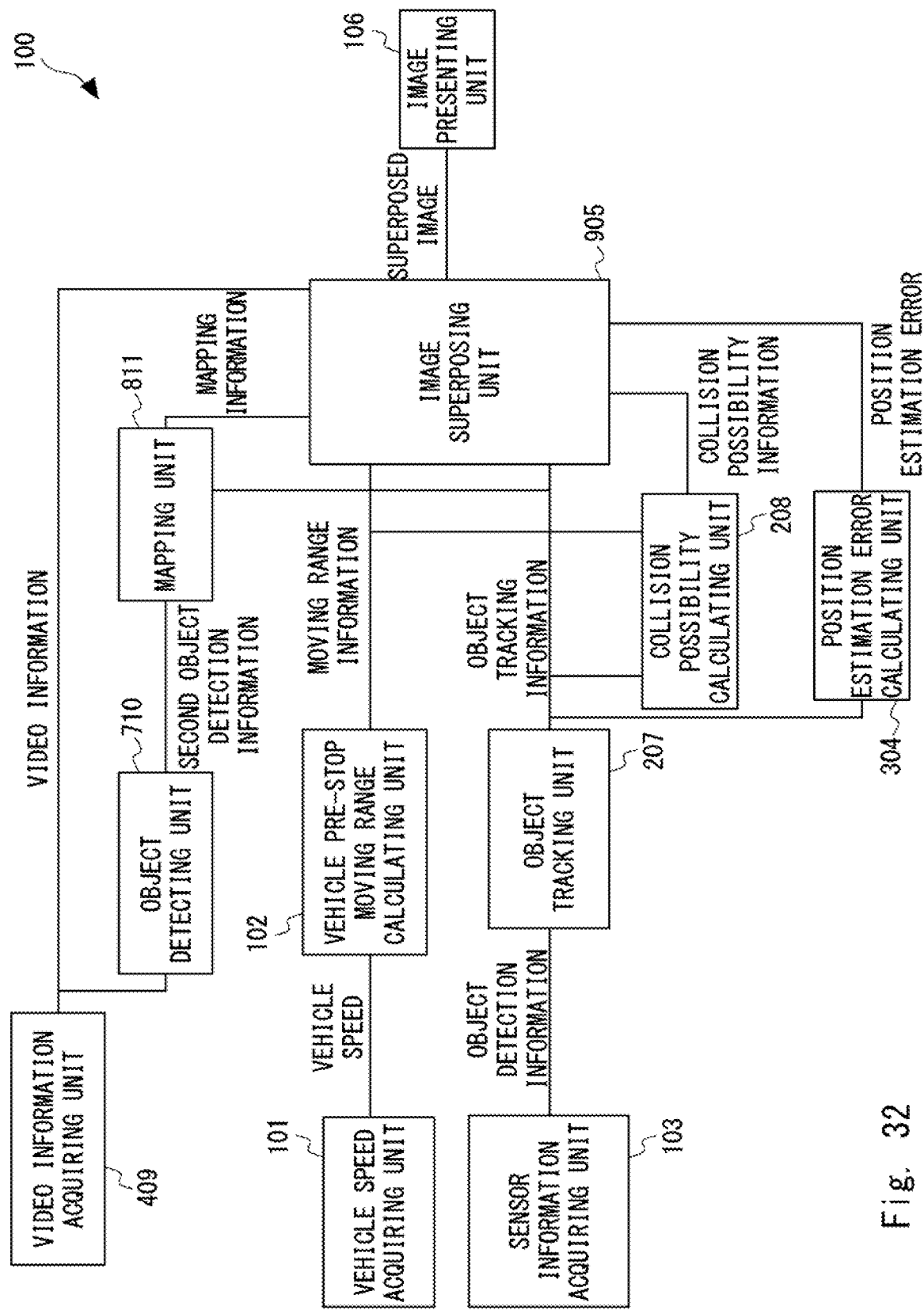
FIG. 32 illustrates a configuration of an image presentation device according to a ninth example embodiment.

FIG. 32 illustrates a configuration of an image presentation device 100 according to the ninth example embodiment. The image presentation device 100 according to the ninth example embodiment includes a vehicle speed acquiring unit 101, a vehicle pre-stop moving range calculating unit 102, a sensor information acquiring unit 103, an object tracking unit 207, a collision possibility calculating unit 208, and a position estimation error calculating unit 304. The image presentation device 100 according to the ninth example embodiment further includes a video information acquiring unit 409, an object detecting unit 710, a mapping unit 811, an image superposing unit 905, and an image presenting unit 106. As compared to the image presentation device 100 according to the sixth example embodiment illustrated in FIG. 26, the image presentation device 100 according to the ninth example embodiment additionally includes the object detecting unit 710 and the mapping unit 811 and includes the image superposing unit 905 in place of the image superposing unit 605. The object detecting unit 710, the mapping unit 811, and the image superposing unit 905 function as, respectively, an object detecting means, a mapping means, and an image superposing means. How the units, other than the object detecting unit 710, the mapping unit 811, and the image superposing unit 905, are connected to each other is substantially the same as in the configuration illustrated in FIG. 26.

Figure 33:
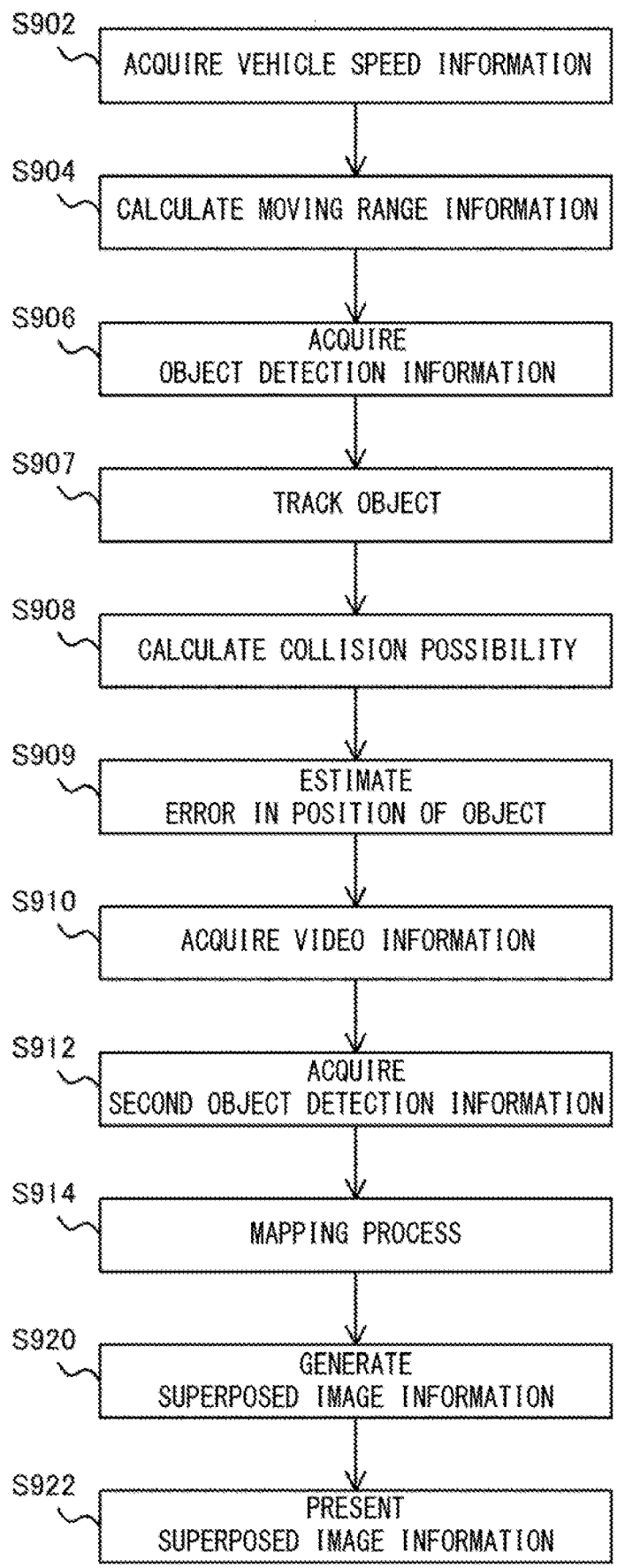
FIG. 33 is a flowchart illustrating an image presentation method executed by the image presentation device according to the ninth example embodiment.

FIG. 33 is a flowchart illustrating an image presentation method executed by the image presentation device 100 according to the ninth example embodiment. The processes at S902 to S910 are substantially the same as the processes at S602 to S610, respectively, illustrated in FIG. 27, and thus descriptions thereof will be omitted.

The object detecting unit 710 performs an object detection process on the video (the image) output from the video information acquiring unit 409 to acquire second object detection information and outputs the second object detection information to the mapping unit 811 (step S912). The mapping unit 811 performs a process of mapping (i.e., associating) the second object detection information output from the object detecting unit 710 to the object tracking information output from the object tracking unit 207 and outputs mapping information to the image superposing unit 905 (step S914). The image superposing unit 905 generates a superposed image based on the moving range information, the object tracking information, the collision possibility information, the position estimation error information, the video information, and the mapping information and outputs superposed image information to the image presenting unit 106 (step S920). The image presenting unit 106 presents (displays) the superposed image information output from the image superposing unit 905 (step S922).

Next, an operation of the image presentation device 100 according to the ninth example embodiment illustrated in FIG. 32 will be described. Operations of the constituent elements other than the object detecting unit 710, the mapping unit 811, and the image superposing unit 905 are substantially the same as those of the counterparts in the image presentation device 100 according to the sixth example embodiment illustrated in FIG. 26. The operations of the object detecting unit 710 and the mapping unit 811 are substantially the same as the operations of the object detecting unit 710 and the mapping unit 811 according to the eighth example embodiment illustrated in FIG. 30.

The operation of the image superposing unit 905 is basically the same as the operation of the image superposing unit 605 according to the sixth example embodiment illustrated in FIG. 26. However, the image superposing unit 905 presents the result of detecting an object from a video and also generates a superposed image with the method of superposing information varied based on the mapping information. The method of presenting the result of detecting an object from a video and the method of varying how the information is superposed based on the mapping information are the same as the methods employed by the image superposing unit 705 according to the seventh example embodiment illustrated in FIG. 28. The generated image is output to the image presenting unit 106 and presented to the driver.

In this manner, according to the ninth example embodiment, a video is presented as well, the result of recognizing an object is superposed and displayed, and the method of superposition is controlled based on this result. This configuration enables the driver to recognize the detected object more reliably through the video. Therefore, the driver can take a more appropriate action for avoiding a collision. In addition, presenting the video as well allows the driver to grasp what the detected object is. Accordingly, as compared to the case according to the sixth example embodiment illustrated in FIG. 26, the driver can grasp the situation surrounding the vehicle more easily.

Hardware Configuration Example Now, a hardware configuration of an image presentation device 100 will be described below. Each constituent element of the image presentation device 100 may be implemented by hardware (e.g., a hardwired electronic circuit or the like) that implements each constituent element. Alternatively, each constituent element of the image presentation device 100 may be implemented by a combination of hardware and software (e.g., a combination of an electronic circuit and a program that controls the electronic circuit or the like). In the following section, a case where each constituent element of the image presentation device 100 is implemented by a combination of hardware and software will be further described.

Figure 34:
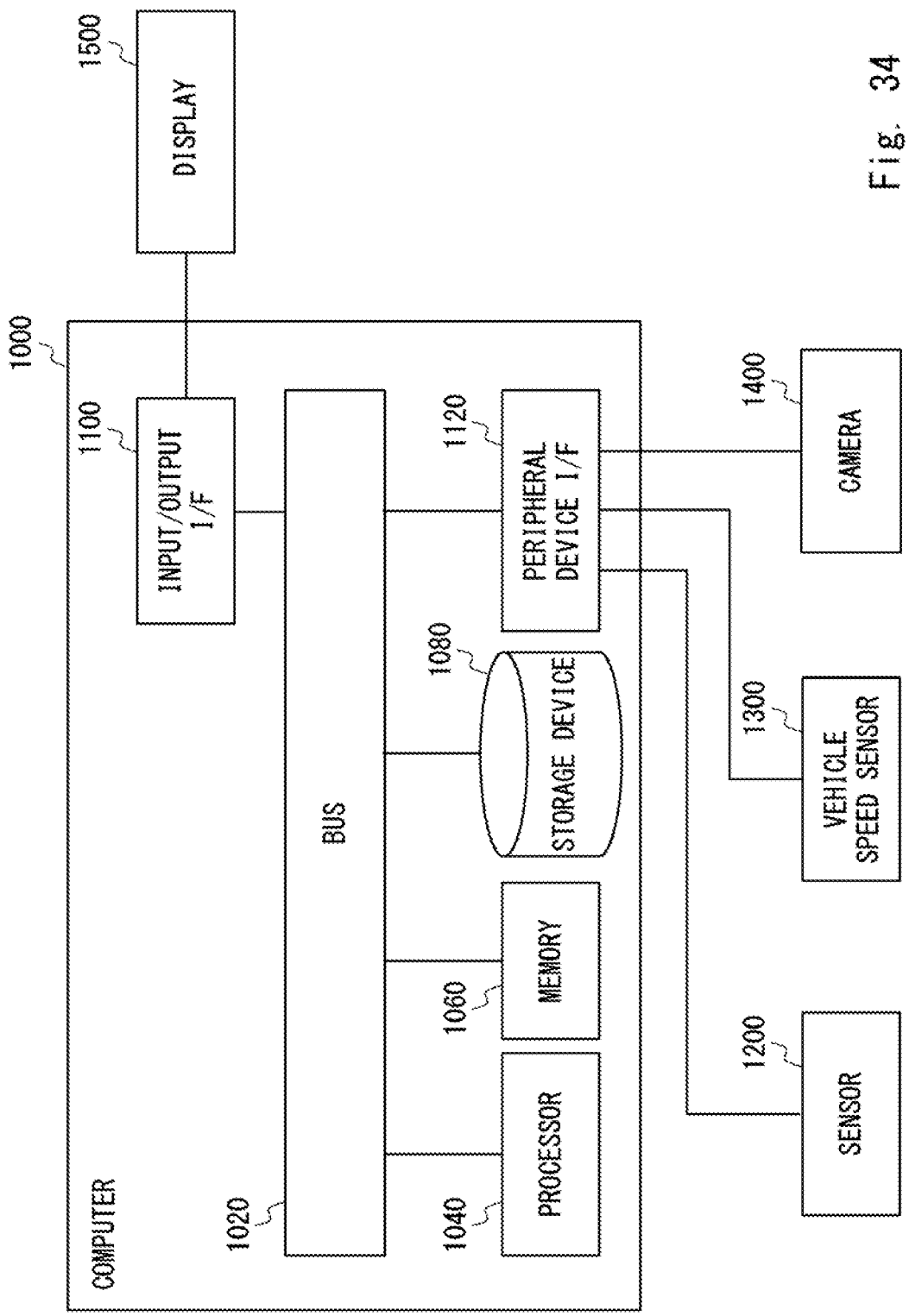
FIG. 34 illustrates an example of a hardware configuration for implementing an image presentation device.

FIG. 34 illustrates an example of a hardware configuration for implementing the image presentation device 100. The hardware configuration may include a computer 1000, a sensor 1200, a vehicle speed sensor 1300, a camera 1400, and a display 1500. The computer 1000 is any desired computer (an information processing device). For example, the computer 1000 is a personal computer (PC), an industrial computer, or the like. The computer 1000 may be a dedicated computer designed to implement the image presentation device 100 or a general-purpose computer.

The computer 1000 includes a bus 1020, a processor 1040, a memory 1060, a storage device 1080, an input/output interface 1100, and a peripheral device interface 1120. The bus 1020 is a data transmission line via which the processor 1040, the memory 1060, the storage device 1080, the input/output interface 1100, and the peripheral device interface 1120 transmit and receive data to and from each other. The connection among the processor 1040 and so on is not limited to the bus connection.

The processor 1040 is any of various processors, such as a central processing unit (CPU), a graphics processing unit (GPU), or a field-programmable gate array (FPGA). The memory 1060 is a main storage device implemented by a random-access memory (RAM) or the like. The storage device 1080 is an auxiliary storage device implemented by a hard disk, a solid-state drive (SSD), a memory card, a read-only memory (ROM), or the like.

The input/output interface 1100 is an interface for connecting the computer 1000 to an input/output device. For example, an input device, such as a keyboard, and an output device, such as a display device, are connected to the input/output interface 1100. In FIG. 34, the display 1500 is connected to the input/output interface 1100, and this display 1500 may correspond to the image presenting unit 106 of the image presentation device 100.

The peripheral device interface 1120 is an interface for connecting a peripheral device to the computer 1000. For example, the peripheral device interface 1120 is a Universal Serial Bus (USB) interface, an IEEE 1394 interface, or the like. Alternatively, for example, the peripheral device interface 1120 is a wired or wireless network interface, a Bluetooth (registered trademark) interface, or the like.

The sensor 1200, the vehicle speed sensor 1300, and the camera 1400 are further connected to the peripheral device interface 1120, and these devices and the computer 1000 can communicate with each other via the peripheral device interface 1120. The sensor 1200, the vehicle speed sensor 1300, and the camera 1400 may correspond to, respectively, the sensor information acquiring unit 103, the vehicle speed acquiring unit 101, and the video information acquiring unit 409 of the image presentation device 100. In a case where the sensor information acquiring unit 103 is implemented by software, the sensor information acquiring unit 103 acquires sensor information from the sensor 1200. In a case where the vehicle speed acquiring unit 101 is implemented by software, the vehicle speed acquiring unit 101 acquires vehicle speed information from the vehicle speed sensor 1300. In a case where the video information acquiring unit 409 is implemented by software, the video information acquiring unit 409 acquires video information from the camera 1400.

The storage device 1080 stores program modules that implement the respective constituent elements of the image presentation device 100. The processor 1040 loads these program modules onto the memory 1060 and execute them, and thus the processor 1040 implements the functions corresponding to the respective program modules.

MODIFIED EXAMPLES

The present invention is not limited to the example embodiments described above, and modifications can be made, as appropriate, within the scope that does not depart from the technical spirit. For example, one or more of the processes at the steps of the flowcharts described above may be omitted. Moreover, the order of the steps of the flowcharts described above can be modified, as appropriate. For example, in FIG. 3, the processes at S102 to S104 may be executed after the processes as S106 to S108. In FIG. 22, the process at S409 may be executed before the processes at S402 to S408. The above applies in a similar manner to the other flowcharts.

The vehicle in which the image presentation device 100 is provided is not limited to a passenger vehicle and includes a working vehicle, such as a forklift, that works in a distribution warehouse or the like. The image presentation device 100 does not have to be provided in a vehicle. In a case where the image presentation device 100 is implemented by the computer 1000, it suffices that the sensor 1200, the vehicle speed sensor 1300, the camera 1400, and the display 1500 be provided in a vehicle. In this case, the image presentation device 100 (the computer 1000) may communicate, for example, wirelessly with the sensor 1200, the vehicle speed sensor 1300, the camera 1400, and the display 1500. The image presentation device 100 may receive various pieces of information from the sensor 1200, the vehicle speed sensor 1300, and the camera 1400 and perform the processes described above, and then the image presentation device 100 may transmit a superposed image to the display 1500. In this case, the process of "presenting a superposed image" performed by the image presenting unit includes the process of transmitting a superposed image to the display 1500.

In the foregoing examples, the programs can be stored by use of various types of non-transitory computer-readable media and supplied to a computer. The non-transitory computer-readable media include various types of tangible storage media. Examples of the non-transitory computer-readable media include a magnetic storage medium (e.g., a flexible disk, a magnetic tape, a hard-disk drive), a magnet-optical storage medium (e.g., a magneto-optical disk), a CD-ROM, a CD-R, a CD-R/W, and a semiconductor memory (e.g., a mask ROM, a programmable ROM (PROM), an erasable PROM (EPROM), a flash ROM, a RAM). The programs may be supplied to a computer by use of various types of transitory computer-readable media. Examples of the transitory computer-readable media include an electric signal, an optical signal, and an electromagnetic wave. The transitory computer-readable media can supply the programs to a computer via a wired communication line, such as an electric wire or an optical fiber, or via a wireless communication line.

Thus far, the invention of the present application has been described with reference to the example embodiments, but the invention of the present application is not limited by the foregoing example embodiments. Various modifications that a person skilled in the art can appreciate within the scope of the invention can be made to the configurations and the details of the invention of the present application.

A part or the whole of the foregoing example embodiments can also be expressed as in the following supplementary notes, which are not limiting.

(Supplementary Note 1)

1. An image presentation device comprising:
   vehicle speed acquiring means configured to acquire a vehicle speed, the vehicle speed being a speed of a vehicle;
   moving range calculating means configured to calculate a pre-stop moving range based on the vehicle speed, the pre-stop moving range being a range within which the vehicle moves before coming to a stop;
   sensor information acquiring means configured to acquire object detection information regarding one or more detected objects, detected by use of a sensor, in surroundings of the vehicle;
   image superposing means configured to
      superpose the pre-stop moving range and positions of the one or more detected objects included in the object detection information on top of each other on a screen, and
      generate a superposed image displaying a position of a detected object, among the detected objects, estimated to have a possibility of overlapping the pre-stop moving range based on position information of the detected object, more saliently than positions of the other detected objects; and
   image presenting means configured to present the generated superposed image.

(Supplementary Note 2)

The image presentation device according to Supplementary note 1, further comprising position estimation error calculating means configured to estimate an error in a position of each of the detected objects based on the position information of the detected objects, and generate position estimation error information indicating the estimated error,
   wherein the image superposing means is configured to superpose the pre-stop moving range, the positions of the detected objects included in the object detection information, and the position estimation error information on top of each other on the screen, and generate the superposed image such that the position of the detected object is displayed saliently if the position estimation error information overlaps the pre-stop moving range.

(Supplementary Note 3)

The image presentation device according to Supplementary note 1, further comprising:
- object tracking means configured to perform a process of tracking a detected object included in the object detection information to generate object tracking information including a relative position and a relative speed of an object to be tracked with respect to the vehicle, the object to be tracked being the tracked detected object; and
- collision possibility calculating means configured to predict, based on a pre-stop elapsed time that elapses before the vehicle comes to a stop and the relative position and the relative speed of the object to be tracked included in the object tracking information, a position where each object to be tracked is located after the pre-stop elapsed time has elapsed, and calculate, based on the predicted position and the pre-stop moving range, a collision possibility index indicating a degree of a possibility that each object to be tracked collides with the vehicle,
- wherein the image superposing means is configured to superpose the pre-stop moving range and the positions of the detected objects on top of each other on the screen, and generate the superposed image displaying more saliently a position of, among the detected objects, a detected object for which the calculated collision possibility index is greater.

(Supplementary Note 4)

The image presentation device according to Supplementary note 3, further comprising position estimation error calculating means configured to estimate an error in a position of each of the detected objects based on position information of the object to be tracked included in the object tracking information, and generate position estimation error information indicating the estimated error,
- wherein the image superposing means is configured to further superpose the position estimation error information on the screen, and generate the superposed image such that the position of the detected object is displayed saliently if the position estimation error information overlaps the pre-stop moving range.

(Supplementary Note 5)

The image presentation device according to any one of Supplementary notes 1 to 4, further comprising video information acquiring means configured to acquire video information indicating a video,
- wherein the image superposing means is configured to generate the superposed image on which the video information is superposed.

(Supplementary Note 6)

The image presentation device according to Supplementary note 5, wherein the image superposing means is configured to calculate an image region corresponding to a position where an object to be displayed saliently is located in the video, and generate the superposed image such that the calculated image region is enlarged.

(Supplementary Note 7)

The image presentation device according to Supplementary note 5 or 6, further comprising:
- object detecting means configured to perform an object detection process on the video to generate second object detection information; and
- mapping means configured to map an object included in the object detection information to an object included in the second object detection information to generate mapping information indicating a result of the mapping,
- wherein the image superposing means is configured to generate a superposed image in which an object related to the object detection information indicated in the mapping information is superposed on the video to present the object.

(Supplementary Note 8)

The image presentation device according to Supplementary note 7, wherein
- the second object detection information includes information indicating a type of a detected object, and
- the image superposing means is configured to change a mode of superposition in accordance with a type of a mapped object.

(Supplementary Note 9)

The image presentation device according to any one of Supplementary notes 1 to 8, wherein
- the moving range calculating means is configured to calculate the pre-stop moving range for each of a plurality of accelerations, and
- the image superposing means is configured to superpose the pre-stop moving range with a display mode varied in stages based on the pre-stop moving range calculated for each of the plurality of accelerations.

(Supplementary Note 10)

The image presentation device according to any one of Supplementary notes 1 to 9, wherein the moving range calculating means is configured to calculate the pre-stop moving range based on at least one of a condition of a road surface, a slope of a road, a weight of the vehicle, or history information of the vehicle speed.

(Supplementary Note 11)

The image presentation device according to any one of Supplementary notes 1 to 10, wherein the image superposing means is configured to acquire a current position of the vehicle and map information of the surroundings of the vehicle, and generate the superposed image so as to be superposed on the current position on the map information.

(Supplementary Note 12)

The image presentation device according to any one of Supplementary notes 1 to 11, wherein the image superposing means is configured to generate the superposed image such that a position of a detected object, among the detected objects, estimated to have a possibility of overlapping the pre-stop moving range at a position close to the vehicle within the pre-stop moving range, is displayed even more saliently.

(Supplementary Note 13)

The image presentation device according to any one of Supplementary notes 1 to 12, wherein the image presenting means is configured to, when presenting the superposed image displaying the position of the detected object saliently, generate the superposed image such that the position of the detected object is presented saliently by performing at least one of showing a mark indicating the position of the detected object in a noticeable color, increasing a size of the mark, causing the mark to flash, further superposing warning information by text, or providing an audible warning.

(Supplementary Note 14)

An image presentation method comprising:
- acquiring a vehicle speed, the vehicle speed being a speed of a vehicle;

calculating a pre-stop moving range based on the vehicle speed, the pre-stop moving range being a range within which the vehicle moves before coming to a stop;

acquiring object detection information regarding one or more detected objects, detected by use of a sensor, in surroundings of the vehicle;

superposing the pre-stop moving range and positions of the one or more detected objects included in the object detection information on top of each other on a screen, and generating a superposed image displaying a position of a detected object, among the detected objects, estimated to have a possibility of overlapping the pre-stop moving range based on position information of the detected object, more saliently than positions of the other detected objects; and presenting the generated superposed image.

(Supplementary Note 15)

The image presentation method according to Supplementary note 14, further comprising:

estimating an error in a position of each of the detected objects based on the position information of the detected objects, and generating position estimation error information indicating the estimated error; and superposing the pre-stop moving range, the positions of the detected objects included in the object detection information, and the position estimation error information on top of each other on the screen, and generating the superposed image such that the position of the detected object is displayed saliently if the position estimation error information overlaps the pre-stop moving range.

(Supplementary Note 16)

The image presentation method according to Supplementary note 14, further comprising:

performing a process of tracking a detected object included in the object detection information to generate object tracking information including a relative position and a relative speed of an object to be tracked with respect to the vehicle, the object to be tracked being the tracked detected object;

predicting, based on a pre-stop elapsed time that elapses before the vehicle comes to a stop and the relative position and the relative speed of the object to be tracked included in the object tracking information, a position where each object to be tracked is located after the pre-stop elapsed time has elapsed, and calculating, based on the predicted position and the pre-stop moving range, a collision possibility index indicating a degree of a possibility that each object to be tracked collides with the vehicle; and superposing the pre-stop moving range and the positions of the detected objects on top of each other on the screen, and generating the superposed image displaying more saliently a position of, among the detected objects, a detected object for which the calculated collision possibility index is greater.

(Supplementary Note 17)

The image presentation method according to Supplementary note 16, further comprising:

estimating an error in a position of each of the detected objects based on position information of the object to be tracked included in the object tracking information, and generating position estimation error information indicating the estimated error; and further superposing the position estimation error information on the screen, and generating the superposed image such that the position of the detected object is displayed saliently if the position estimation error information overlaps the pre-stop moving range.

(Supplementary Note 18)

The image presentation method according to any one of Supplementary notes 14 to 17, further comprising:

acquiring video information indicating a video; and generating the superposed image on which the video information is superposed.

(Supplementary Note 19)

The image presentation method according to Supplementary note 18, further comprising calculating an image region corresponding to a position where an object to be displayed saliently is located in the video and generating the superposed image such that the calculated image region is enlarged.

(Supplementary Note 20)

The image presentation method according to Supplementary note 18 or 19, further comprising:

performing an object detection process on the video to generate second object detection information;

mapping an object included in the object detection information to an object included in the second object detection information to generate mapping information indicating a result of the mapping; and generating a superposed image in which an object related to the object detection information indicated in the mapping information is superposed on the video to present the object.

(Supplementary Note 21)

The image presentation method according to Supplementary note 20, wherein the second object detection information includes information indicating a type of a detected object, and a mode of superposition is changed in accordance with a type of a mapped object.

(Supplementary Note 22)

The image presentation method according to any one of Supplementary notes 14 to 21, further comprising:

calculating the pre-stop moving range for each of a plurality of accelerations; and superposing the pre-stop moving range with a display mode varied in stages based on the pre-stop moving range calculated for each of the plurality of accelerations.

(Supplementary Note 23)

The image presentation method according to any one of Supplementary notes 14 to 22, further comprising calculating the pre-stop moving range based on at least one of a condition of a road surface, a slope of a road, a weight of the vehicle, or history information of the vehicle speed.

(Supplementary Note 24)

The image presentation method according to any one of Supplementary notes 14 to 23, further comprising acquiring a current position of the vehicle and map information of the surroundings of the vehicle and generating the superposed image so as to be superposed on the current position on the map information.

(Supplementary Note 25)

The image presentation method according to any one of Supplementary notes 14 to 24, further comprising generating the superposed image such that a position of a detected object, among the detected objects, estimated to have a possibility of overlapping the pre-stop moving range at a position close to the vehicle within the pre-stop moving range, is displayed even more saliently.

(Supplementary Note 26)

The image presentation method according to any one of Supplementary notes 14 to 25, further comprising, when presenting the superposed image displaying the position of the detected object saliently, generating the superposed image such that the position of the detected object is presented saliently by performing at least one of showing a mark indicating the position of the detected object in a noticeable color, increasing a size of the mark, causing the mark to flash, further superposing warning information by text, or providing an audible warning.

(Supplementary Note 27)

A non-transitory computer-readable medium storing a program that causes a computer to execute:
- a step of acquiring a vehicle speed, the vehicle speed being a speed of a vehicle;
- a step of calculating a pre-stop moving range based on the vehicle speed, the pre-stop moving range being a range within which the vehicle moves before coming to a stop;
- a step of acquiring object detection information regarding one or more detected objects, detected by use of a sensor, in surroundings of the vehicle;
- a step of superposing the pre-stop moving range and positions of the one or more detected objects included in the object detection information on top of each other on a screen, and generating a superposed image displaying a position of a detected object, among the detected objects, estimated to have a possibility of overlapping the pre-stop moving range based on position information of the detected object, more saliently than positions of the other detected objects; and
- a step of presenting the generated superposed image.

REFERENCE SIGNS LIST 1 image presentation device
2 vehicle speed acquiring unit
4 moving range calculating unit
6 sensor information acquiring unit
8 image superposing unit
10 image presenting unit
100 image presentation device
101 vehicle speed acquiring unit
102 vehicle pre-stop moving range calculating unit
103 sensor information acquiring unit
104 position estimation error calculating unit
105 image superposing unit
106 image presenting unit
205 image superposing unit
207 object tracking unit
208 collision possibility calculating unit
304 position estimation error calculating unit
305 image superposing unit
405 image superposing unit
409 video information acquiring unit
505 image superposing unit
605 image superposing unit
705 image superposing unit
710 object detecting unit
711 mapping unit
805 image superposing unit
811 mapping unit
905 image superposing unit

What is claimed is:

1. An image presentation device comprising:
at least one memory storing instructions; and
at least one processor configured to execute the instructions to:
acquire a vehicle speed of a vehicle;
calculate a pre-stop moving range based on the vehicle speed, the pre-stop moving range being a range within which the vehicle moves before coming to a stop;
acquire object detection information regarding a plurality of objects detected by a sensor in surroundings of the vehicle;
perform tracking of the objects included in the object detection information to generate object tracking information including, for each object, a relative position and a relative speed of each object with respect to the vehicle;
predict a position where each object is located after a pre-stop elapsed time that elapses before the vehicle comes to the stop, based on the pre-stop elapsed time and the relative position and the relative speed of each object;
calculate, based on the predicted position of each object and the calculated pre-stop moving range, a collision possibility index indicating a degree of a possibility that each object will collide with the vehicle;
superpose the pre-stop moving range and a current position of each object on top of each other on a screen;
identify, among the objects, a first object having a possibility of overlapping the pre-stop moving range and for which the calculated collision possibility index is greatest;
generate a superposed image displaying the current position of the first object more saliently than the current position of each object other than the first object; and
display the generated superposed image.

2. The image presentation device according to claim 1, wherein the at least one processor is further configured to execute the instructions to:
estimate an error in the current position of each object based on position information of each object;
generate position estimation error information for each object indicating the estimated error of each object;
superpose the pre-stop moving range of each object, the current position of each object and the position estimation error information for each object on top of each other on the screen; and
generate the superposed image such that the current position of the first detected object is displayed more saliently than the current position of each object other than the first object if the position estimation error information for the first object overlaps the pre-stop moving range of the first object.

3. The image presentation device according to claim 1, wherein the at least one processor is further configured to execute the instructions to;
acquire video information indicating a video; and
generate the superposed image on which the video information is superposed.

4. The image presentation device according to claim 3, wherein the at least one processor is further configured to execute the instructions to:
calculate an image region corresponding to a position where the first object is located in the video; and
generate the superposed image such that the calculated image region is enlarged.

5. The image presentation device according to claim 3, wherein the at least one processor is further configured to execute the instructions to:

perform an object detection process on the video to generate second object detection information;

map each object included in the object detection information to a corresponding object included in the second object detection information to generate mapping information indicating a mapping result; and generate the superposed image in which each object indicated in the mapping information is superposed on the video.

6. The image presentation device according to claim 5, wherein the second object detection information includes information indicating an object type, and the at least one processor further is configured to execute the instructions to change a mode of superposition in accordance with an object type of each object indicated in the mapping information.

7. The image presentation device according to claim 1, wherein the at least one processor is further configured to execute the instructions to:

calculate a plurality of pre-stop moving ranges for a respective plurality of accelerations; and superpose the plurality of pre-stop moving ranges with a display mode that varies in stages based on the plurality of pre-stop moving ranges.

8. The image presentation device according to claim 1, wherein the at least one processor is further configured to execute the instructions to calculate the pre-stop moving range based on at least one of a condition of a road surface, a slope of a road, a weight of the vehicle, or history information of the vehicle speed.

9. The image presentation device according to claim 1, wherein the at least one processor is further configured to execute the instructions to;

acquire a current position of the vehicle and map information of the surroundings of the vehicle; and generate the superposed image so as to be superposed on the current position of the vehicle on the map information.

10. The image presentation device according to claim 1, wherein the at least one processor is further configured to execute the instructions to generate the superposed image such that the current position of the first object is displayed even more saliently as the current position of the first object is closer to the vehicle within the pre-stop moving range.

11. The image presentation device according to claim 1, wherein the at least one processor is further configured to execute the instructions to generate the superposed image such that the current position of the first object is presented more saliently by performing at least one of showing a mark indicating the current position of the first object in a noticeable color, increasing a size of the mark, causing the mark to flash, further superposing warning information by text, or providing an audible warning.

12. An image presentation method performed by a computer and comprising:

acquiring a vehicle speed of a vehicle;

calculating a pre-stop moving range based on the vehicle speed, the pre-stop moving range being a range within which the vehicle moves before coming to a stop;

acquiring object detection information regarding a plurality of objects detected by a sensor in surroundings of the vehicle;

performing tracking of the objects included in the object detection information to generate object tracking information including, for each object, a relative position and a relative speed of each object with respect to the vehicle;

predicting a position where each object is located after a pre-stop elapsed time that elapses before the vehicle comes to the stop, based on the pre-stop elapsed time and the relative position and the relative speed of each object;

calculating, based on the predicted position of each object and the calculated pre-stop moving range, a collision possibility index indicating a degree of a possibility that each object will collide with the vehicle;

superposing the pre-stop moving range and a current position of each object on top of each other on a screen;

identifying, among the objects, a first object having a possibility of overlapping the pre-stop moving range and for which the calculated collision possibility index is greatest;

generating a superposed image displaying the current position of the first object more saliently than the current position of each object other than the first object; and displaying the generated superposed image.

13. The image presentation method according to claim 12, further comprising:

estimating an error in the current position of each object based on position information of each object;

generating position estimation error information for each object indicating the estimated error of each object;

superposing the pre-stop moving range of each object, the current position of each object and the position estimation error information for each object on top of each other on the screen; and generating the superposed image such that the current position of the first detected object is displayed more saliently than the current position of each object other than the first object if the position estimation error information for the first object overlaps the pre-stop moving range of the first object.

14. The image presentation method according to claim 12, further comprising:

acquiring video information indicating a video; and generating the superposed image on which the video information is superposed.

15. The image presentation method according to claim 14, further comprising:

calculating an image region corresponding to a position where the first object is located in the video; and generating the superposed image such that the calculated image region is enlarged.

16. A non-transitory computer-readable medium storing instructions executable by a processor to perform processing comprising:

acquiring a vehicle speed of a vehicle;

calculating a pre-stop moving range based on the vehicle speed, the pre-stop moving range being a range within which the vehicle moves before coming to a stop;

acquiring object detection information regarding a plurality of objects detected by a sensor in surroundings of the vehicle;

performing tracking of the objects included in the object detection information to generate object tracking information including, for each object, a relative position and a relative speed of each object with respect to the vehicle;

predicting a position where each object is located after a pre-stop elapsed time that elapses before the vehicle comes to the stop, based on the pre-stop elapsed time and the relative position and the relative speed of each object;

calculating, based on the predicted position of each object and the calculated pre-stop moving range, a collision possibility index indicating a degree of a possibility that each object will collide with the vehicle;

superposing the pre-stop moving range and a current position of each object on top of each other on a screen;

identifying, among the objects, a first object having a possibility of overlapping the pre-stop moving range and for which the calculated collision possibility index is greatest;

generating a superposed image displaying the current position of the first object more saliently than the current position of each object other than the first object; and displaying the generated superposed image.

* * * * *